United States Patent
Yasukawa et al.

(10) Patent No.: US 10,638,284 B2
(45) Date of Patent: Apr. 28, 2020

(54) USER APPARATUS, BASE STATION AND NOTIFICATION METHOD

(71) Applicant: NTT DOCOMO, INC., Tokyo (JP)

(72) Inventors: Shimpei Yasukawa, Tokyo (JP); Satoshi Nagata, Tokyo (JP); Qun Zhao, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 15/772,635

(22) PCT Filed: Oct. 31, 2016

(86) PCT No.: PCT/JP2016/082264
§ 371 (c)(1),
(2) Date: May 1, 2018

(87) PCT Pub. No.: WO2017/077977
PCT Pub. Date: May 11, 2017

(65) Prior Publication Data
US 2018/0317221 A1    Nov. 1, 2018

(30) Foreign Application Priority Data

Nov. 5, 2015  (JP) ................. 2015-218011

(51) Int. Cl.
*H04W 72/04* (2009.01)
*H04W 4/40* (2018.01)
*H04W 92/18* (2009.01)
*H04W 76/14* (2018.01)
*H04L 5/00* (2006.01)

(52) U.S. Cl.
CPC ............ *H04W 4/40* (2018.02); *H04L 5/0053* (2013.01); *H04W 72/04* (2013.01); *H04W 72/0413* (2013.01); *H04W 76/14* (2018.02); *H04W 92/18* (2013.01)

(58) Field of Classification Search
CPC ... H04W 4/40; H04W 76/14; H04W 72/0413; H04W 92/18; H04W 72/04; H04L 5/0053
See application file for complete search history.

(56) References Cited

U.S. PATENT DOCUMENTS 9,930,643 B2 * 3/2018 Cheng ................ H04W 76/14
2016/0338127 A1 * 11/2016 Matsumoto .......... H04W 76/14

FOREIGN PATENT DOCUMENTS

WO    2015/115505 A1    8/2015

OTHER PUBLICATIONS

International Search Report issued in PCT/JP2016/082264 dated Nov. 22, 2016 (3 pages).

(Continued)

*Primary Examiner* — Vinncelas Louis
(74) *Attorney, Agent, or Firm* — Osha Liang LLP

(57) ABSTRACT

A user apparatus according to an embodiment is provided in a wireless communication system in which D2D communications are supported. The user apparatus includes a resource allocation unit configured to allocate a resource for D2D control information to be transmitted at a transmission timing subsequent to a predetermined transmission timing; and a transmission unit configured to transmit resource reservation information including information indicating the resource for D2D control information.

11 Claims, 22 Drawing Sheets

(56) References Cited

OTHER PUBLICATIONS

Written Opinion of the International Searching Authority issued in in PCT/JP2016/082264 dated Nov. 22, 2016 (6 pages).
Intel Corporation; "eNB Controlled Resource Allocation for D2D Communication"; 3GPP TSG RAN WG1 Meeting #77, R1-142017; Seoul, Korea; May 19-23, 2014 (6 pages).
3GPP TS 36.213 V12.7.0; "3rd Generation Partnership Project; Technical Specification Group Radio Access Network; Evolved Universal Terrestrial Radio Access (E-UTRA); Physical layer procedures (Release 12)"; Sep. 2015 (241 pages).
"Key drivers for LTE success: Services Evolution," Sep. 2011, 3GPP, Internet URL: http://www.3gpp.org/ftp/Information/presentations/presentations_2011/2011_09_LTE_Asia/2011_LTE-Asia_3GPP_Service_evolution.pdf (15 pages).
Extended European Search Report issued in the counterpart European Patent Application No. 16862037.5, dated Aug. 27, 2018 (14 pages).
Office Action issued in corresponding Japanese Application No. 2017-548750, dated Aug. 28, 2018 (6 pages).

\* cited by examiner

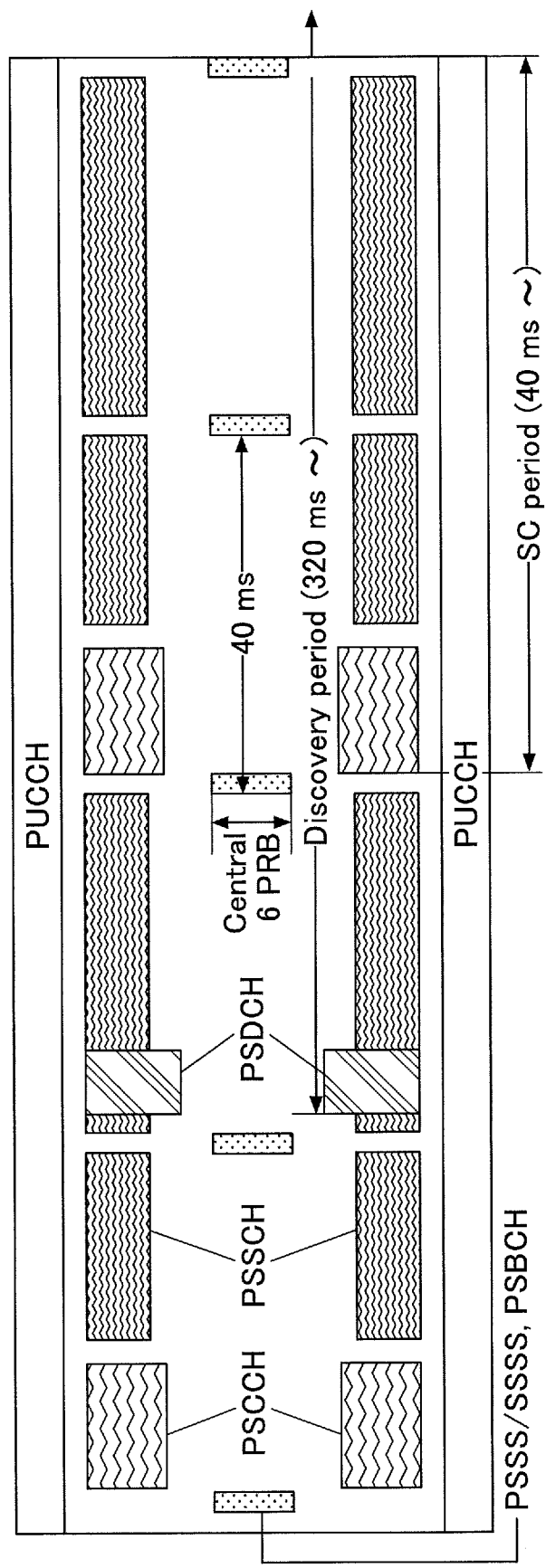

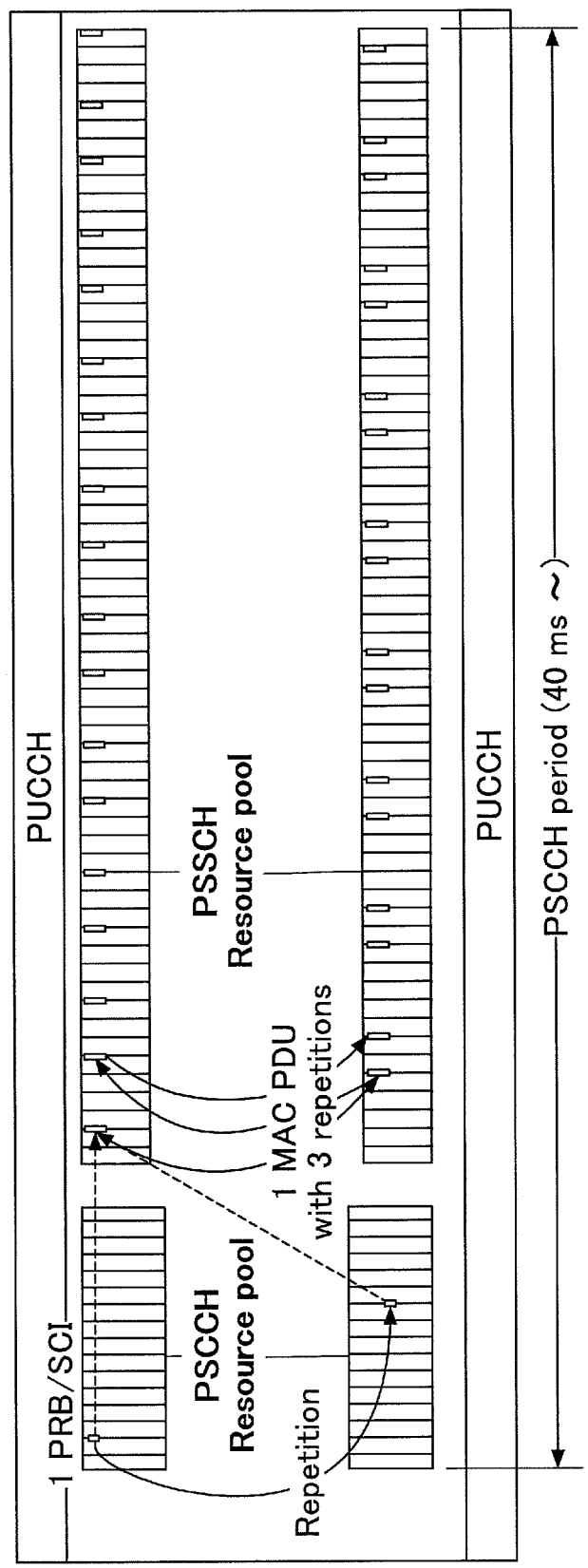

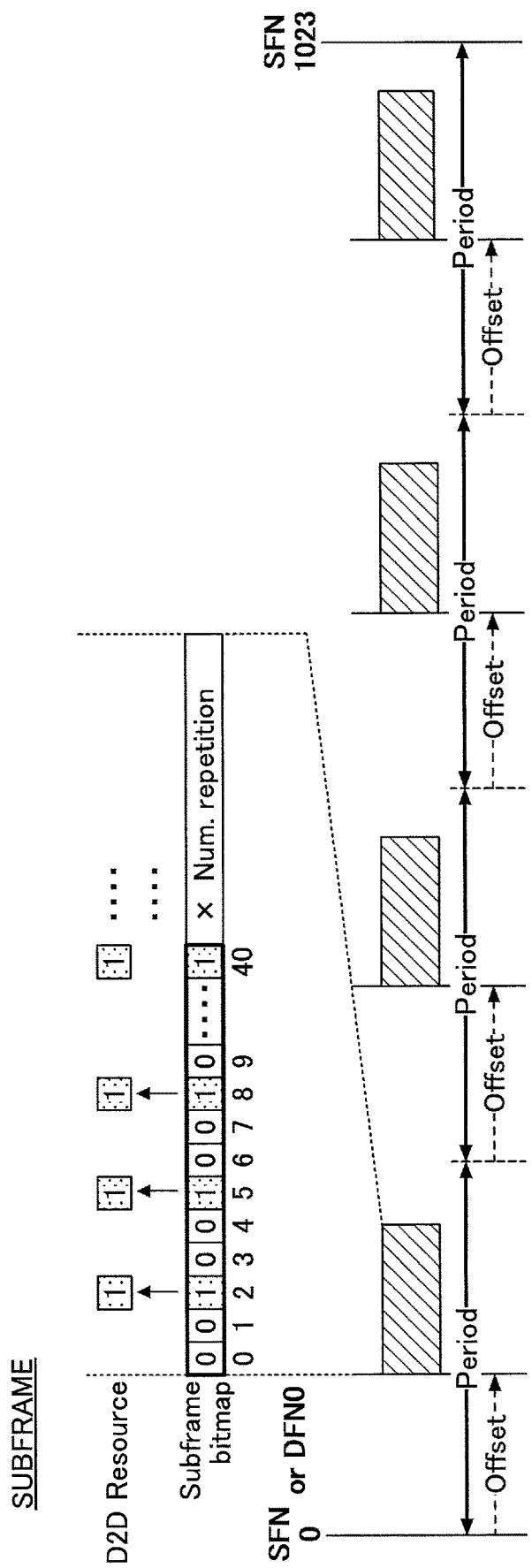

RESOURCE BLOCK

USER APPARATUS, BASE STATION AND NOTIFICATION METHOD

BACKGROUND OF THE INVENTION

1. Field of the Invention

The present invention relates to a user apparatus, a base station and an indication method.

2. Description of the Related Art

D2D (Device to Device) techniques, in which user apparatuses directly communicate with each other without involving a radio base station, have been discussed in an LTE (Long Term Evolution) system and LTE successor systems (also referred to as, for example, LTE-A (LTE Advanced), FRA (Future Radio Access), 4G, or the like) (e.g., NPL 1).

The D2D enables traffic reduction between a user apparatus and a base station, and enables communications between user apparatuses even in the case where base station communications are not available at the time of disaster or the like.

The D2D is roughly divided into "D2D discovery" used for discovering another user apparatus available for communication and "D2D communication" (also referred to as "D2D direct communication", "direct communication between terminals" or the like) used for performing direct communications between user apparatuses. In the following, the "D2D communications" and the "D2D discovery" are simply referred to as "D2D" when they are not particularly distinguished. Further, a signal transmitted and received in D2D is referred to as a D2D signal.

Further, in 3GPP (3rd Generation Partnership Project), it has been discussed to enhance D2D functions to realize V2X. Here, the V2X is a part of ITS (Intelligent Transport Systems), and is a generic term for V2V (Vehicle to Vehicle), which means a form of communications performed between automobiles, V2I (Vehicle to Infrastructure), which means a form of communications performed between a vehicle and a road-side unit (RSU) installed on the roadside, V2N (Vehicle to Nomadic device), which means a form of communications performed between a vehicle and a mobile terminal of a driver, and V2P (Vehicle to Pedestrian), which means a form of communications performed between a vehicle and a mobile terminal of a pedestrian.

CITATION LIST

Non-Patent Literature

[NPL 1] "Key drivers for LTE success: Services Evolution", September, 2011, 3GPP, Internet URL: http://www.3gpp.org/ftp/Information/presentations/presentations_2011/2011_09_LTE_Asia/2011_LTE-Asia_3GPP_Service_evolution.pdf
[NPL 2] 3GPP TS36.213 V12.7.0 (2015-09)

SUMMARY OF THE INVENTION

Technical Problem

In V2X, a traffic model is assumed in which transmission packets (messages) are generated periodically in an approximate 100 ms cycle. Further, it is assumed that sizes of the packets periodically transmitted in the cycle are not constant as in the so-called voice data, but fluctuate to some extent.

In conventional LTE, a resource allocation method is defined in which semi-static resource allocation is periodically performed by a base station eNB for UL communications of a user apparatus (Semi-Persistent Scheduling). However, it is assumed in the Semi-Persistent Scheduling that sizes of transmitted data are constant, and thus, it is difficult to apply the Semi-Persistent Scheduling as is to the traffic model assumed in V2X.

Further, V2X techniques are based on the D2D techniques defined in LTE. In the current D2D techniques, such a technique that is capable of performing appropriate resource allocation for periodic data traffic in which data sizes fluctuate as described above does not exist.

It should be noted that, when considering the fact that V2X is a type of D2D, the above-described problem may occur not only in V2X but also in D2D in general.

The present invention has been made in view of the above. It is an object of the present invention to provide a technique in which, in a D2D supported wireless communication system, it is possible to appropriately perform resource allocation for periodic D2D traffic in which data sizes fluctuate.

Solution to Problem

A user apparatus according to an embodiment is provided in a wireless communication system in which D2D communications are supported. The user apparatus includes a resource allocation unit configured to allocate a resource for D2D control information to be transmitted at a transmission timing subsequent to a predetermined transmission timing; and a transmission unit configured to transmit resource reservation information including information indicating the resource for the D2D control information.

Further, a base station according to an embodiment is provided in a wireless communication system in which D2D communications are supported. The base station includes a resource allocation unit configured to allocate resources for D2D control information and D2D data to be transmitted in a predetermined cycle; and a transmission unit configured to transmit to the user apparatus information indicating the resources for the D2D control information and the D2D data.

Advantageous Effects of Invention

According to an embodiment, a technique is provided in which, in a D2D supported wireless communication system, it is possible to appropriately perform resource allocation for periodic D2D traffic in which data sizes fluctuate.

BRIEF DESCRIPTION OF THE DRAWINGS

FIG. 5 is a drawing illustrating an example of a channel structure used in D2D.

FIG. 7A is a drawing illustrating a structure example of a PSCCH and a PSSCH.

FIG. 8A is a drawing illustrating a resource pool configuration.

DETAILED DESCRIPTION OF THE PREFERRED EMBODIMENTS

Figure 1:
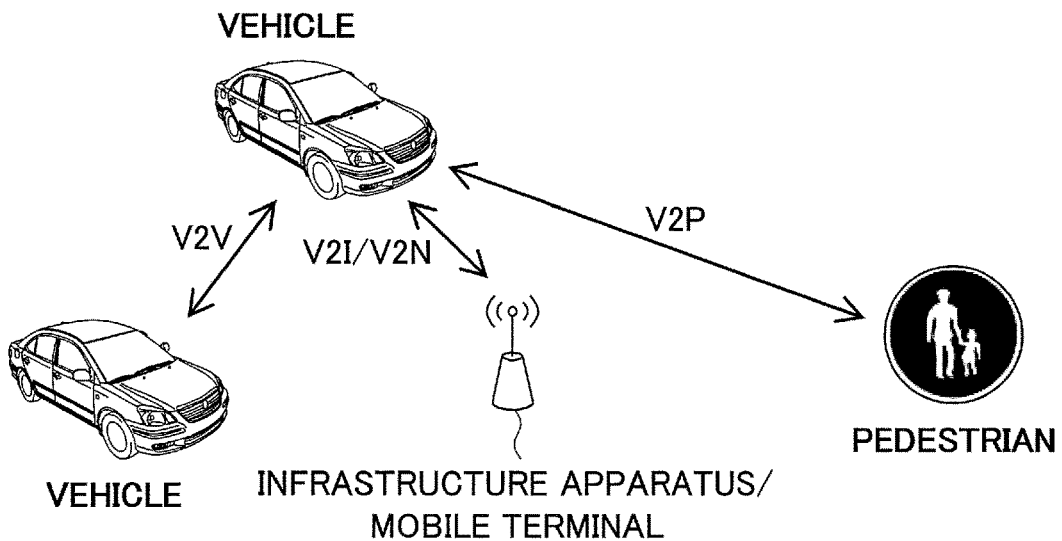
FIG. 1 is a drawing illustrating V2X.

In the following, referring to the drawings, embodiments of the present invention will be described. It should be noted that the embodiments described below are merely examples and the embodiments to which the present invention is applied are not limited to the following embodiments. For example, it is assumed that a wireless communication system according to an embodiment complies with LTE standard. However, the present invention can be applied not only to LTE, but also to other schemes. It should be noted that, in the application specification and claims, the term "LTE" is used in a wider sense in which not only a communication method corresponding to 3GPP release 12 or 13, but also a fifth generation communication method corresponding to 3GPP release 14, or later is included.

Further, although V2X is a main target of an embodiment, a technique according to an embodiment not only can be applied to V2X but also can be widely applied to D2D in general. Further, "D2D" includes V2X in its meaning.

Further, "D2D" is used for not only referring to processing steps in which a D2D signal is transmitted and received to and from user apparatuses UE, but also for including processing steps in which a base station eNB receives (monitors) a D2D signal, and processing steps in which a user apparatus UE transmits an uplink signal to the base station eNB in the case of an RRC idle or in the case where the user apparatus UE has not established connection with the base station eNB.

<D2D Overview>

A V2X technique according to an embodiment is based on the D2D technique defined in LTE. Therefore, first, an overview of the D2D defined in LTE will be described. It should be noted that the D2D technique described here can be used in the V2X, and, it is possible for a user apparatus UE according to an embodiment to transmit and receive a D2D signal according to the D2D technique.

Figure 2A:
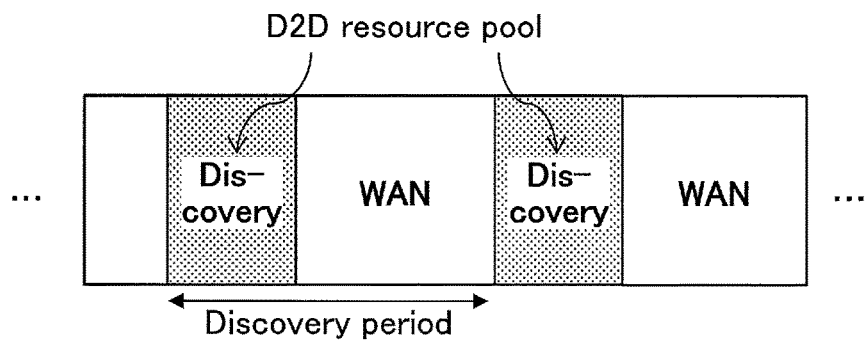
FIG. 2A is a drawing illustrating D2D.

As described above, D2D is roughly divided into "Discovery" and "Communication". Regarding the "Discovery", as illustrated in FIG. 2A, a resource pool for a Discovery message is reserved in each Discovery period, and a user apparatus UE transmits a Discovery message within the resource pool. More specifically, within "Discovery", there is a Type 1 and a Type 2b as follows: In Type 1, the user apparatus UE autonomously selects a transmission resource from the resource pool. In Type 2b, a more semi-static resource is allocated by upper layer signaling (e.g., RRC signal).

Figure 2B:
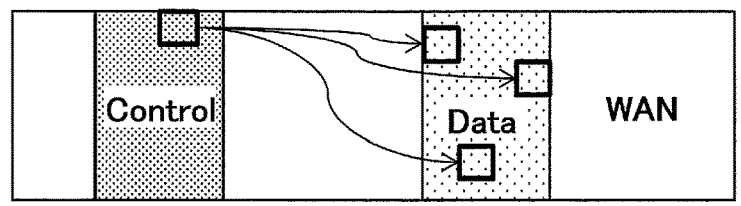
FIG. 2B is a drawing illustrating D2D.

Regarding the "Communication", as illustrated in FIG. 2B, resource pools for Control/Data transmission are also periodically reserved. The period is referred to as an SA period (scheduling assignment period) or an SC period (sidelink control period). A transmission side user apparatus UE transmits to a reception side user apparatus UE a data transmission resource by using SCI (Sidelink Control Information) through a resource selected from a Control resource pool (SCI resource pool) and transmits data through the data transmission resource. More specifically, within "Communications", there is a Mode 1 and a Mode 2 as follows: In Mode 1, resources are allocated more dynamically by (E)PDCCH transmitted from a base station eNB to a user apparatus UE. In Mode 2, the user apparatus UE autonomously selects a transmission resource from the resource pool. Regarding the resource pool, a resource pool may be transmitted by SIB, or a predefined resource pool may be used.

In LTE, a channel used for "Discovery" is referred to as PSDCH (Physical Sidelink Discovery Channel), a channel used for transmitting control information including SCI, etc., in "Communication" is referred to as PSCCH (Physical Sidelink Control Channel), and a channel used for transmitting data is referred to as PSSCH (Physical Sidelink Shared Channel) (NPL 2).

Figure 3:
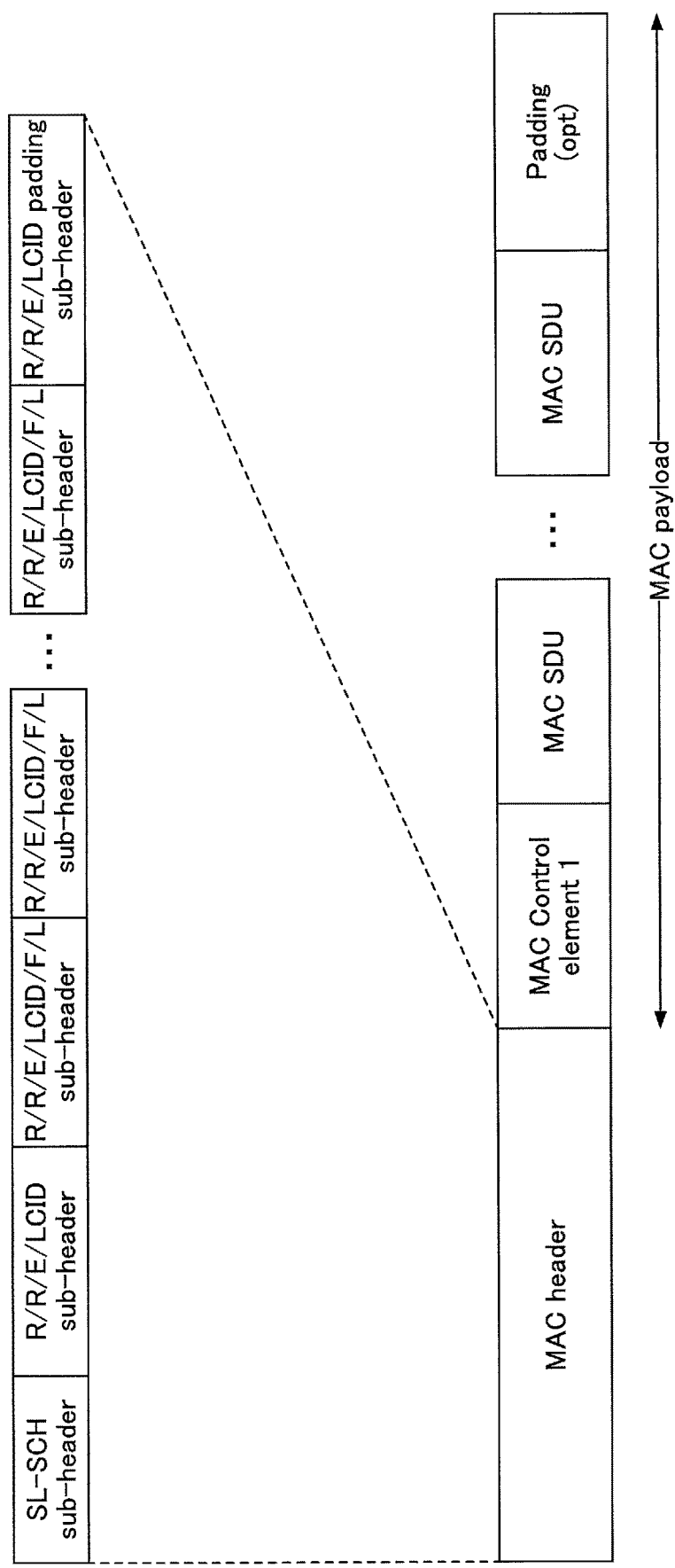
FIG. 3 is a drawing illustrating MAC PDU used in D2D communications.

MAC (Medium Access Control) PDU (Protocol Data Unit) used in D2D communications includes at least a MAC header, a MAC Control element, a MAC SDU (Service Data Unit), and a Padding as illustrated in FIG. 3. The MAC PDU may include other information. The MAC header includes a single SL-SCH (Sidelink Shared Channel) sub-header and one or more MAC PDU sub-headers.

Figure 4:
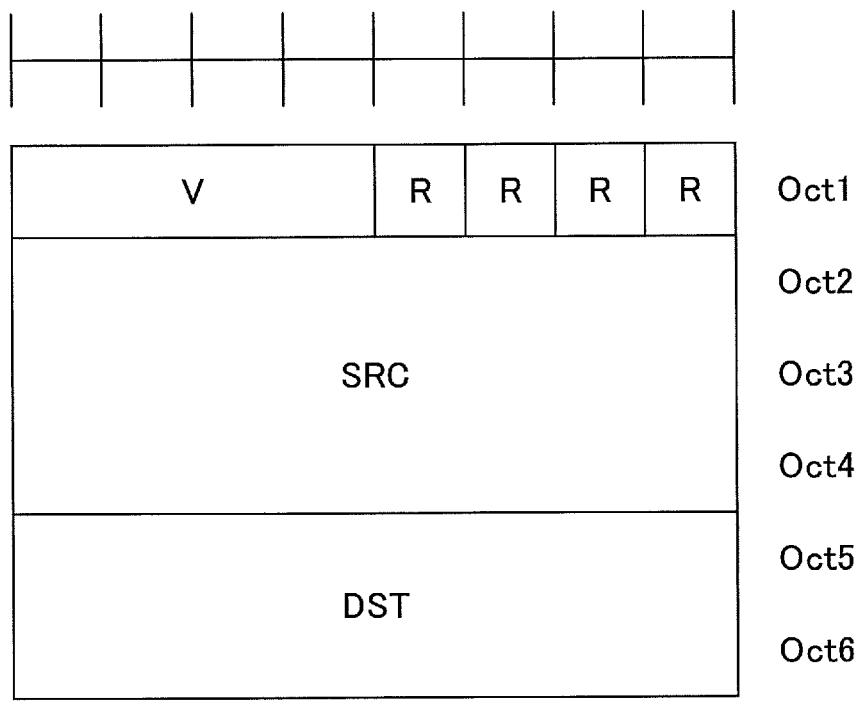
FIG. 4 is a drawing illustrating a format of an SL-SCH sub-header.

As illustrated in FIG. 4, the SL-SCH sub-header includes a MAC PDU format version (V), transmission source information (SRC), transmission destination information (DST), a Reserved bit (R), etc. The V is allocated at the beginning of the SL-SCH sub-header, and indicates a MAC PDU format version used by the user apparatus UE. In the transmission source information, information related to a transmission source is set. In the transmission source information, an identifier related to a ProSe UE ID is set. In the transmission destination information, information related to a transmission destination is set. In the transmission destination information, information related to a ProSe Layer-2 Group ID of the transmission destination may be set.

FIG. 5 illustrates an example of a D2D channel structure. As illustrated in FIG. 5, a PSCCH resource pool and a PSSCH resource pool used for "Communication" are allocated. Further, a PSDCH resource pool used for "Discovery" is allocated with a period longer than a period of a channel for Communication.

Further, a PSSS (Primary Sidelink Synchronization signal) and a SSSS (Secondary Sidelink Synchronization signal) are used as D2D synchronization signals. Further, for example, a PSBCH (Physical Sidelink Broadcast Channel) for transmitting broadcast information including a D2D system band for out-of-coverage operation, a frame number, resource configuration information or the like is used.

Figures 6A, 6B:
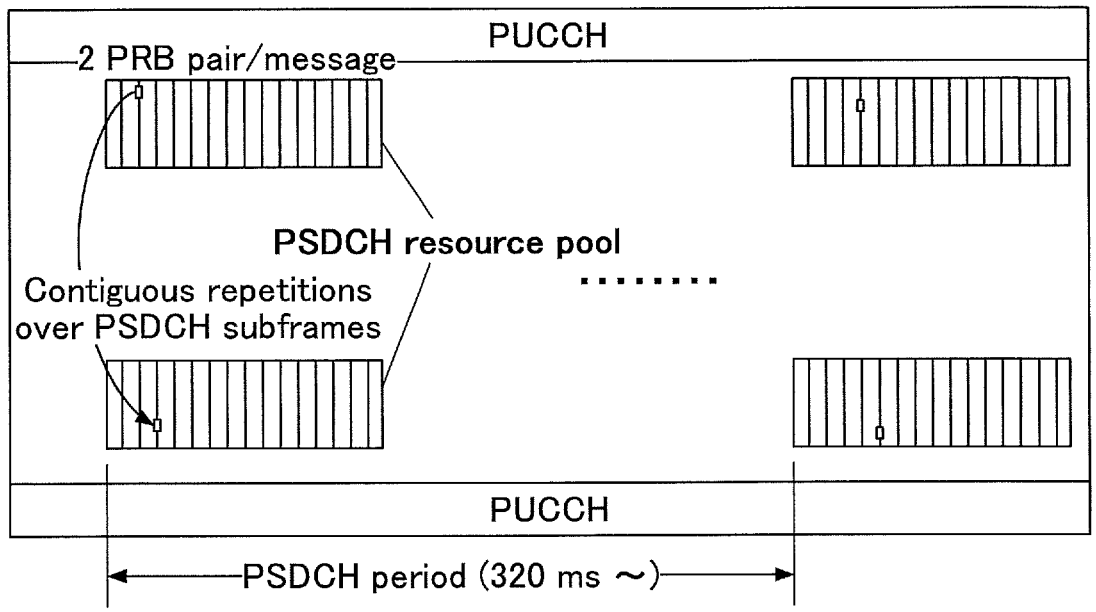
FIG. 6A is a drawing illustrating a structure example of a PSDCH.
FIG. 6B is a drawing illustrating a structure example of a PSDCH.

FIG. 6A illustrates an example of a PSDCH resource pool used for "Discovery". A resource pool is set by using a subframe bitmap, and thus, the resource pool looks like an image illustrated in FIG. 6A. Resource pools of other channels also have a similar image. Further, regarding the PSDCH, repeated transmission (repetition) is performed while performing frequency hopping. The number of repetitions can be set as, for example, 0-4. Further, as illustrated in FIG. 6B, the PSDCH has a PUSCH based structure, in which a DMRS (demodulation reference signal) is inserted.

Figure 7B:
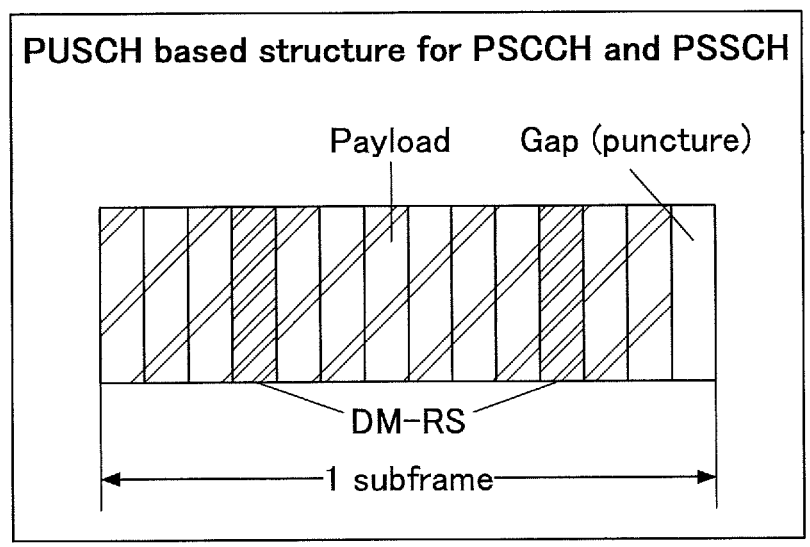
FIG. 7B is a drawing illustrating a structure example of a PSCCH and a PSSCH.

FIG. 7A illustrates examples of resource pools of a PSCCH and a PSSCH used for "Communication". As illustrated in FIG. 7A, regarding the PSCCH, repeated transmission (repetition) is performed once while performing frequency hopping. Regarding the PSSCH, repeated transmission (repetition) is performed three times while performing frequency hopping. Further, as illustrated in FIG. 7B, the PSCCH and the PSSCH have a PUSCH based structure, in which a DMRS is inserted.

Figure 8B:
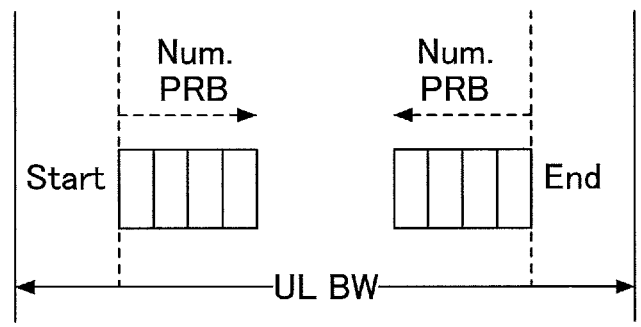
FIG. 8B is a drawing illustrating a resource pool configuration.

FIG. 8A and FIG. 8B illustrate an example of a resource pool configuration in PSCCH, PSDCH, PSSCH (Mode 2). As illustrated in FIG. 8A, a resource pool is represented as a subframe bitmap in the time direction. Further, the bitmap is repeated as many as num.repetition times. Further, an offset indicating a starting position in each period is specified.

In the frequency direction, contiguous allocation and non-contiguous allocation are available. FIG. 8B illustrates an example of non-contiguous allocation. As illustrated in the figure, a start PRB, an end PRB, and the number of PRBs (numPRB) are specified.

<System Configuration>

Figure 9:
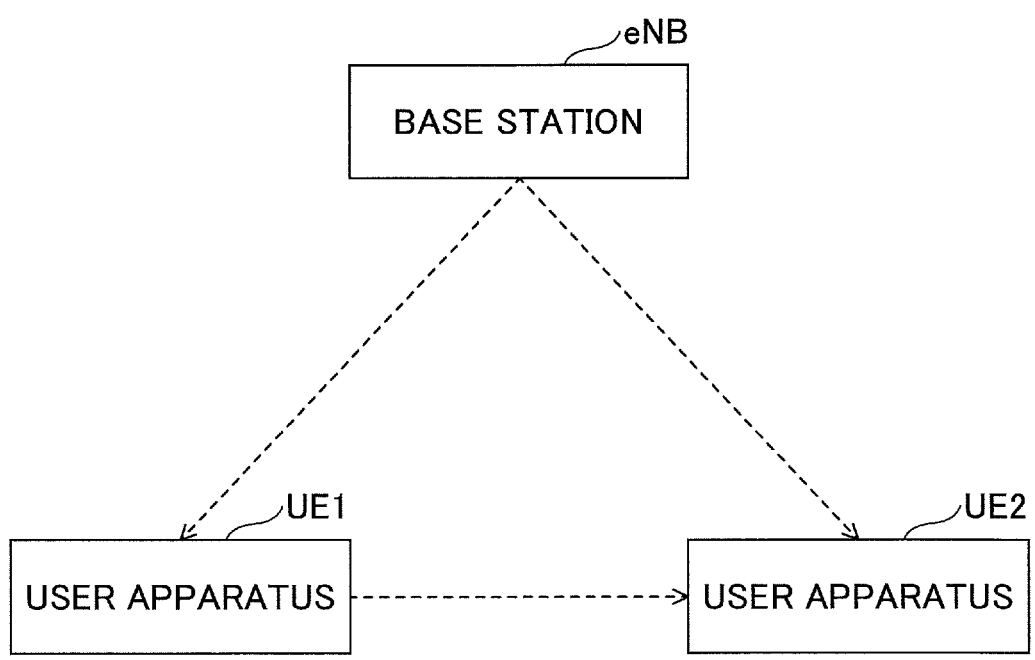
FIG. 9 is a drawing illustrating a structure example of a wireless communication system according to an embodiment.

FIG. 9 is a drawing illustrating a configuration example of a wireless communication system according to an embodiment. As illustrated in FIG. 9, the wireless communication system includes a base station eNB, a user apparatus UE1, and a user apparatus UE2. In FIG. 9, the user apparatus UE1 is indicated as a transmission side and the user apparatus UE2 is indicated as a reception side. However, the user apparatus UE1 and the user apparatus UE2 each have a transmission function and a reception function. In the following, the user apparatus UE1 and the user apparatus UE2 are simply described as "user apparatus UE" in the case where they are not particularly distinguished. Communications of data, etc., between the user apparatuses UE according to an embodiment are performed without involving the base station eNB.

The user apparatus UE1 and the user apparatus UE2 illustrated in FIG. 9 each have a cellular communication function as a user apparatus UE in LTE and a D2D function including signal transmission and reception by using channels described above. Further, the user apparatus UE1 and the user apparatus UE2 have a function for performing operations described in an embodiment. It should be noted that regarding the cellular communication function and the existing D2D function, the user apparatus UE1 and the user apparatus UE2 may have a part of the above functions (in such a range that operations described in an embodiment can be performed) or may have all of the above functions.

Further, each user apparatus UE may be any apparatus that performs V2X, and, for example, each user apparatus UE may be a vehicle, a terminal possessed by a pedestrian, an RSU (a UE type RSU that has a UE function), etc.

Further, the base station eNB includes a cellular communication function as a base station eNB in LTE and a function for enabling communications of a user apparatus UE according to an embodiment (a resource allocation function, a configuration (setting) information transmission function or the like). Further, the base station eNB includes an RSU (an eNB type RSU that has an eNB function).

<Overview>

As described above, in D2D, a user apparatus UE transmits control information, which indicates a data transmission resource, and data by using resources of a PSCCH resource pool and a PSSCH resource pool in a predetermined SC period unit. In other words, the data transmission resource indicated by the control information is any one of resources in the PSSCH resource pool in the predetermined SC period.

Figure 10A:
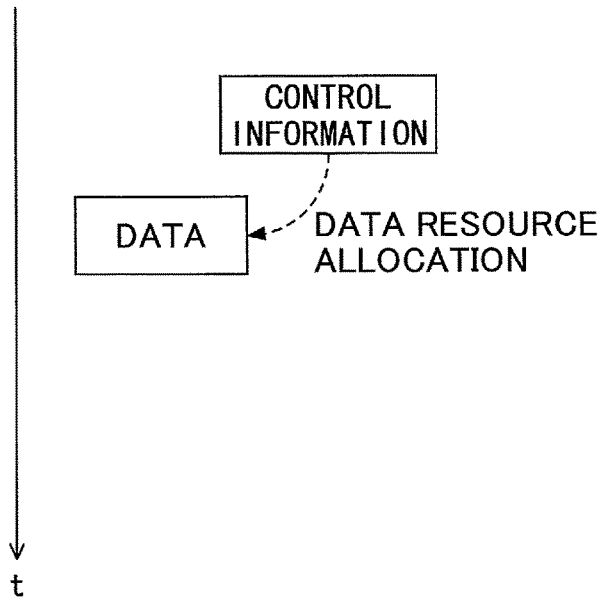
FIG. 10A is a drawing illustrating a communication method discussed in D2D.
Figure 10B:
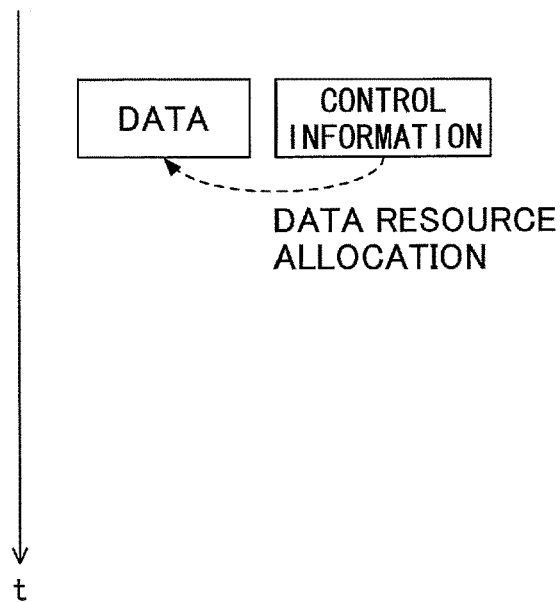
FIG. 10B is a drawing illustrating a communication method discussed in D2D.
Figure 10C:
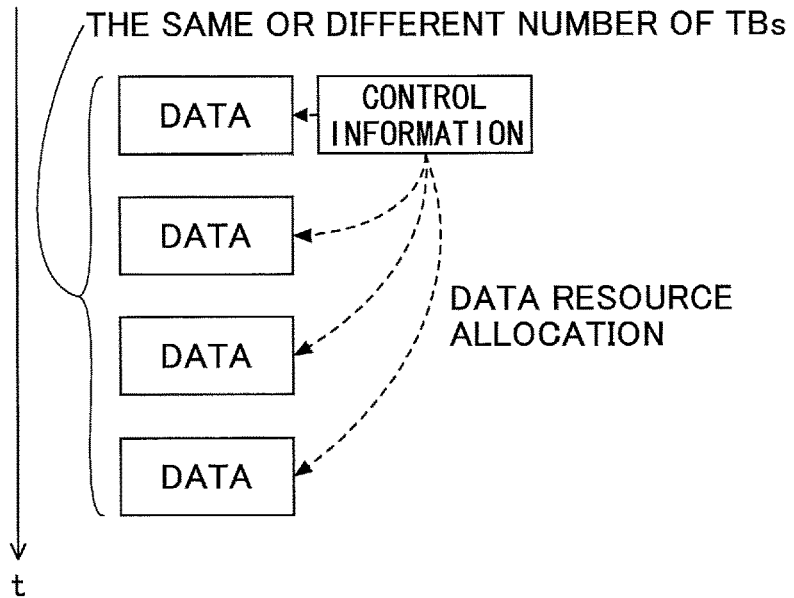
FIG. 10C is a drawing illustrating a communication method discussed in D2D.

Currently, in 3GPP, various communication methods are being proposed for securing low latency communications required for V2X, not only with control information and data being transmitted in different time areas (FIG. 10A) as defined in conventional D2D. For example, as illustrated in FIG. 10B, a communication method has been proposed in which it is possible to transmit control information and data in the same time area (e.g., a same subframe or a symbol). Further, a communication method has been proposed in which control information and data are multiplexed in a specific resource in a resource pool, in transmission. Further, in the conventional D2D, basically, it is possible for a user apparatus UE to transmit only a single control information item in the same SC period. However, in the future, a communication method may be assumed in which there is no concept at all of an SC period itself. An embodiment may be applied to any communication method described above. Further, an embodiment can be applied not only to a communication method in which a control information item and a data transmission resource are corresponding to each other 1 to 1 as illustrated in FIG. 10A and FIG. 10B, but also to a communication method in which a single control information item is associated with multiple data transmission resources as illustrated in FIG. 10C.

According to an embodiment, in addition to transmitting control information and data at a predetermined timing, the transmission side user apparatus UE1 transmits to the reception side user apparatus UE2 a resource for transmitting control information and/or data that will be transmitted at a timing later than the predetermined timing by using the control information or the data transmitted at the predetermined timing.

In the following description, information indicating a resource for transmitting control information and/or data that will be transmitted at a timing later than the predetermined timing is referred to as "resource reservation information" for the sake of convenience. Further, allocating a resource for transmitting control information and/or data that will be transmitted at a timing later than the predetermined timing may be referred to as "reserving" a resource.

Upon receiving resource reservation information included in the control information or data received at the predetermined timing, the reception side user apparatus UE2 determines that the transmission side user apparatus UE1 is going to transmit the next control information and/or data by using the resource indicated by the resource reservation information, and performs an operation for monitoring the resource or for not transmitting a D2D signal by using the resource. It should be noted that, in the following description, the term "reception side user apparatus UE2" is used to include a specific user apparatus UE (unicast), an unspecified user apparatus UE (broadcast) and a user apparatus UE that belongs to a specific group (groupcast).

In the following, embodiments will be divided into a first embodiment, a second embodiment, and a third embodiment. The first embodiment, the second embodiment, and the third embodiment will be described.

According to an embodiment, a user apparatus UE may have functions of a method related to the first embodiment, a method related to the second embodiment, and a method related to the third embodiment, and may determine which method is used for transmission based on, for example, configuration information from a base station eNB. However, the above is only an example. The user apparatus UE may correspond to (be adapted to) only one of the method related to the first embodiment, the method related to the second embodiment, and the method related to the third embodiment.

First Embodiment

First, a first embodiment will be described.

According to a first embodiment, in addition to transmitting control information and data at a predetermined timing, a transmission side user apparatus UE1 transmits, by using the control information or the data transmitted at the predetermined timing, to a reception side user apparatus UE2 resource reservation information indicating a resource of control information and data that will be transmitted at a timing later than the predetermined timing. In the first embodiment, there is an example 1-1 and an example 1-2 as more detailed operation examples. In the example 1-1, the user apparatus UE transmits to the reception side user apparatus UE2 resource reservation information that indicates only a resource of control information and data that will be transmitted at a timing subsequent to the predetermined timing. In the example 1-2, the user apparatus UE transmits to the reception side user apparatus UE2 resource reservation information that indicates resources of control information and data that will be transmitted in a predetermined cycle after the predetermined timing.

Example 1-1: Single Reservation

Figure 11A:
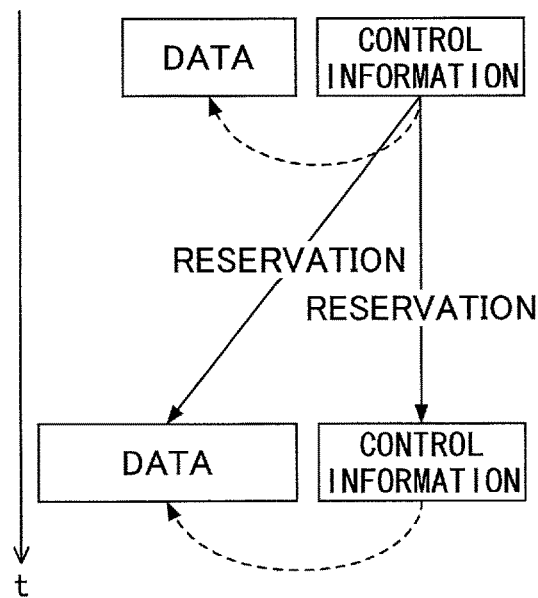
FIG. 11A is a drawing illustrating a resource reservation method according to a first embodiment.

FIG. 11A illustrates a resource reservation method in the example 1-1. The lower layer (layer 1 or layer 2) of the user apparatus UE obtains a size of data to be transmitted at the subsequent timing of a predetermined timing from an indication, etc., from an upper layer (layer 3, etc.), and determines a resource position/range, etc., for including data reserved to be transmitted at the subsequent timing.

Next, as illustrated in FIG. 11A, the user apparatus UE includes, in control information to be transmitted at the predetermined timing, resource allocation information indicating resources for data to be transmitted at the predetermined timing (MCS, resource position/range, TA, group destination ID, etc., hereinafter referred to as "resource allocation information") and resource reservation information indicating resources for control information and data to be transmitted at the subsequent timing, in transmission.

In the example 1-1 (basically, also in the example 1-2), the resource reservation information may include information similar to the resource allocation information, such as resource positions/range related to resources for control information and data, TA, and a group destination ID. Further, information, which is not directly related to the resources such as MCS, TA, etc., may not need to be included in the resource reservation information. For example, only a resource position/range may be included, or, a resource position/range and a group destination ID indicating an address of the reception side user apparatus UE2 may be included. By including the group destination ID, it is possible to transmit to the reception side user apparatus UE an indication indicating whether the resource reservation information is for a specific user apparatus UE (unicast), for an unspecified user apparatus UE (broadcast), or, for user apparatuses UE that belong to a specific group (groupcast).

Figure 12A:
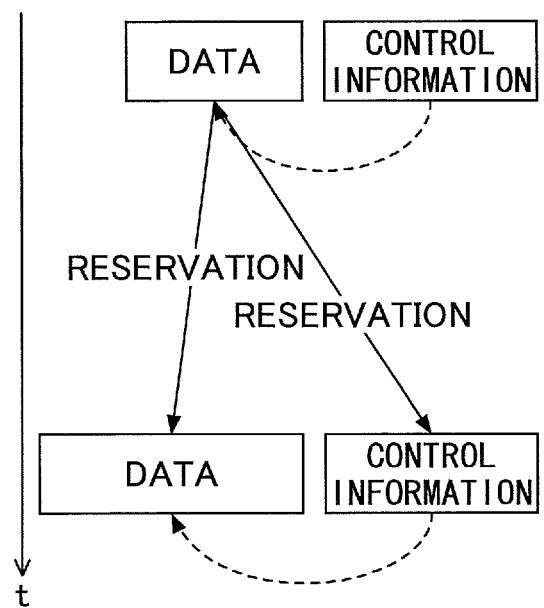
FIG. 12A is a drawing illustrating a resource reservation method according to the first embodiment.

It should be noted that, in the example 1-1, the user apparatus UE may not include the resource reservation information in control information that is transmitted at the predetermined timing, but, as illustrated in FIG. 12A, may include the resource reservation information in MAC control information included in data that is transmitted at the predetermined timing in transmission.

According to the example 1-1, the user apparatus UE only needs to reserve resources for the subsequent transmission timing, and thus, it is possible for the user apparatus UE to correspond to (be adapted to) packet size fluctuation in a flexible manner.

Example 1-2: Semi-Static Reservation

Figure 11B:
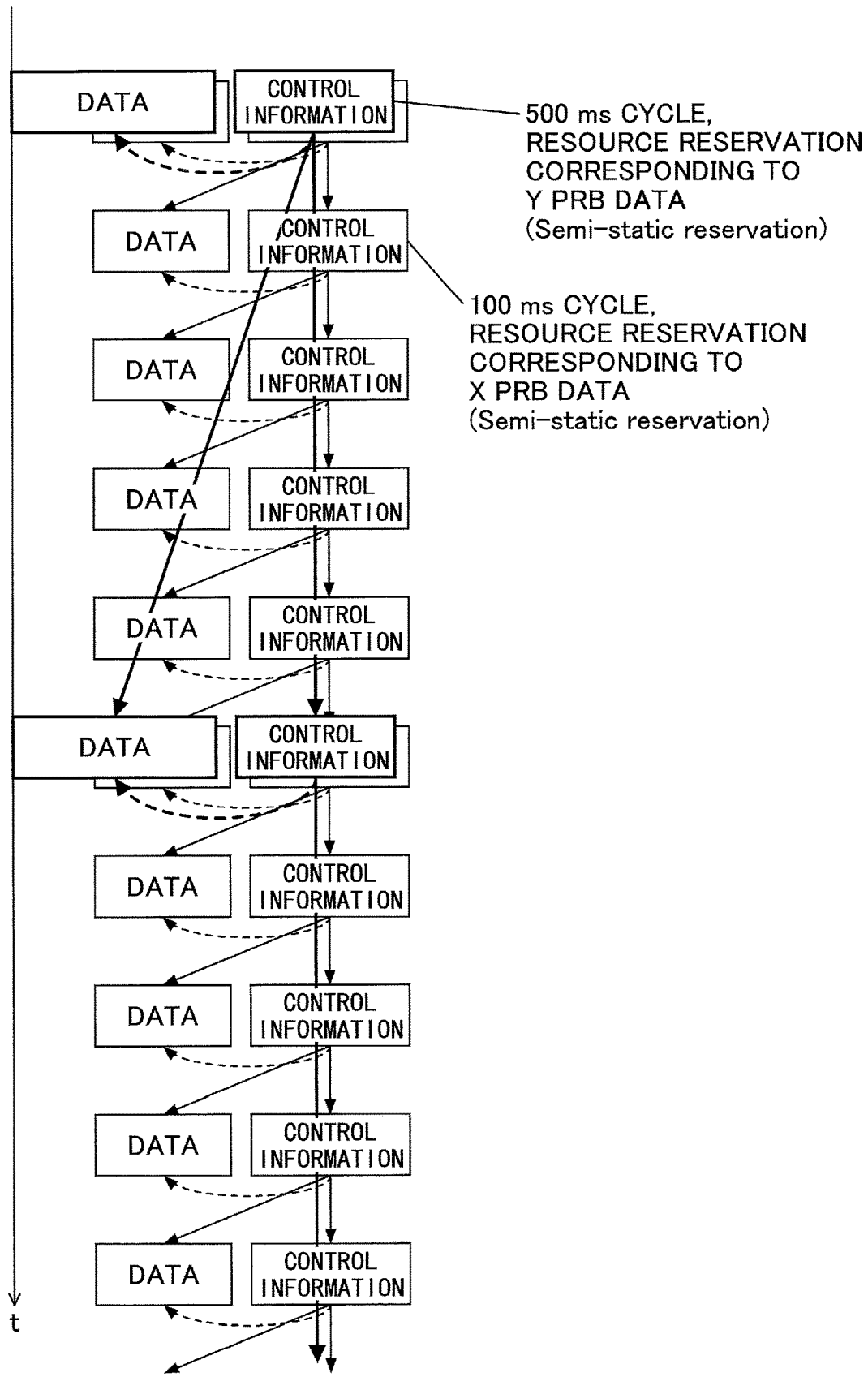
FIG. 11B is a drawing illustrating a resource reservation method according to the first embodiment.

FIG. 11B illustrates a resource reservation method in an example 1-2. In the example 1-2, the user apparatus UE transmits to the reception side user apparatus UE2 resource reservation information that indicates resources of control information and data that will be transmitted in a predetermined cycle after the predetermined timing. Further, the user apparatus UE multiplexes resource reservation information items of different cycles in transmission to the reception side user apparatus UE2.

In an example of FIG. 11B, the user apparatus UE reserves resources for control information and data in a 100 ms cycle (the number of PRBs=X) and also reserves resources for control information and data in a 500 ms cycle (the number of PRBs=Y).

Further, the user apparatus UE includes, in control information that is transmitted every 100 ms, resource allocation information and resource reservation information indicating resources for control information and data that are transmitted in the 100 ms cycle, in transmission. Further, the user apparatus UE includes, in control information that is transmitted every 500 ms, resource allocation information and resource reservation information indicating resources for control information and data that are transmitted in the 500 ms cycle, in transmission.

In the example 1-2, the resource reservation information not only indicates a resource reserved for the subsequent timing as in the example 1-1, but also indicates resources commonly reserved for a plurality of consecutive timings. Upon receiving the resource reservation information, it is possible for the reception side user apparatus UE2 to determine that the resources are reserved consecutively in a predetermined cycle, regardless of the reception timing in which the reception side user apparatus UE2 receives the resource reservation information.

Figure 12B:
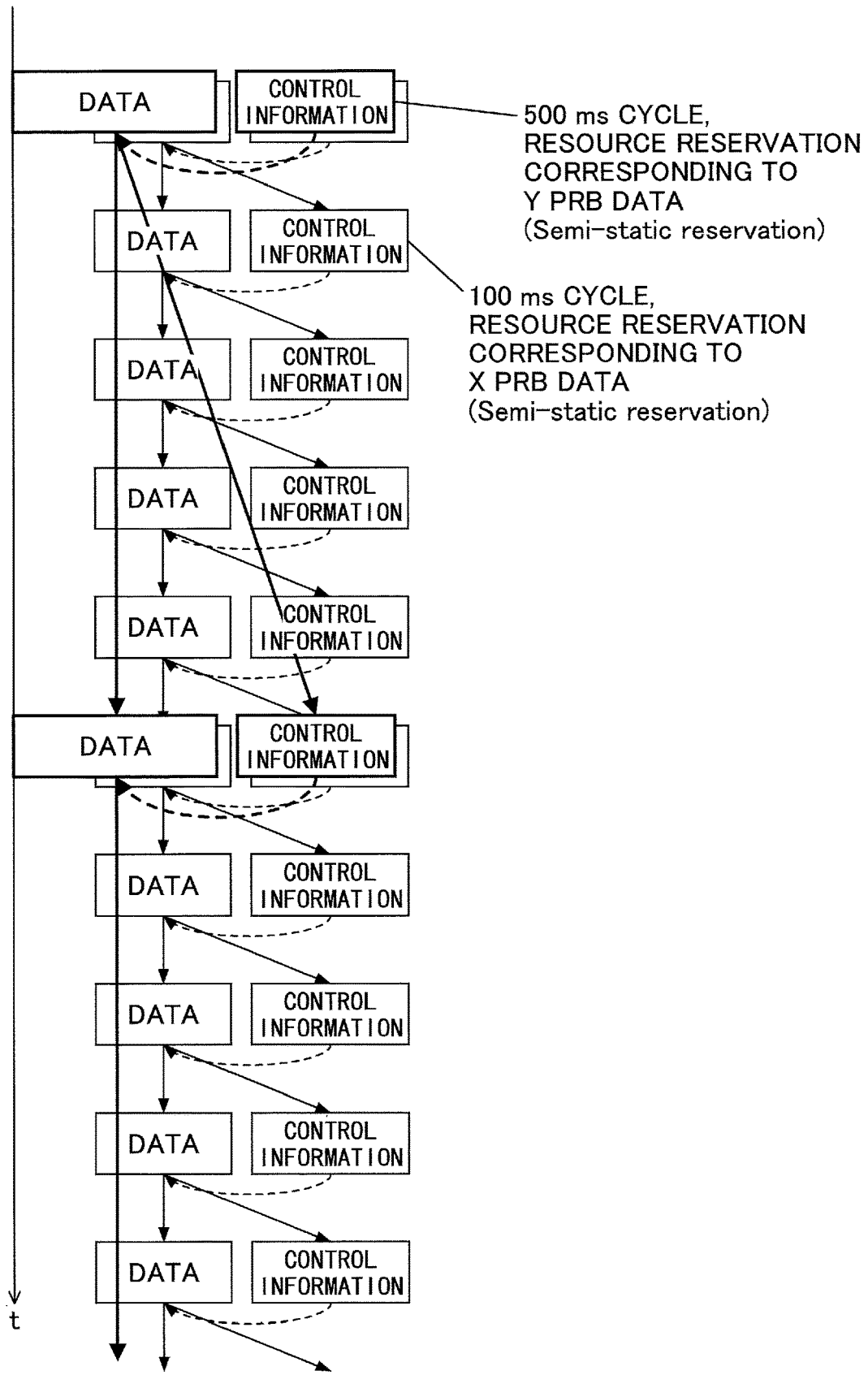
FIG. 12B is a drawing illustrating a resource reservation method according to the first embodiment.

In the example 1-2, the user apparatus UE, instead of including the resource reservation information in the control information that is transmitted at the predetermined timing, may, as illustrated in FIG. 12B, include the resource reservation information in MAC control information included in data that is transmitted at the predetermined timing, in transmission.

At the timings when the resource reservations are overlapped, the transmission side user apparatus UE1 may transmit data by using only the resource that can include a larger size packet (e.g., a resource whose number of PRBs is greater).

In this case, at the timings when resource reservations are overlapped, the transmission side user apparatus UE1 may not need to transmit control information that relates to a cycle in which the resource including a smaller size packet is to be transmitted. Specifically, with respect to an example of FIG. 11B, at the timings of 500 ms cycle, the user apparatus UE1 may not need to transmit control information that is transmitted in a 100 ms cycle.

Further, as another example, at the timings when resource reservations are overlapped, the transmission side user apparatus UE1 may not need to include, in the control information that relates to a cycle in which a resource including a smaller size packet is to be transmitted, resource allocation information but may include only resource reservation information, in transmission.

Further, as yet another example, control information including resource allocation information may be separated from control information including resource reservation information, and the transmission side user apparatus UE1 may not need to transmit the control information including resource allocation information related to a resource that can include a smaller size packet, at the timing when resource reservations are overlapped.

Further, as yet another example, in the case where the reception side user apparatus UE2 receives multiple control information items at the same timing, the reception side user apparatus UE2 may compare resource allocation information items included in the control information items, and may receive only data that is mapped to a resource that can include a larger size packet.

In the example 1-2, resource reservations with different cycles are performed in an overlapping manner, and thus, at the timings of overlapping cycles (at the timings of a 500 ms cycle in an example of FIG. 11B), the amount of data that the user apparatus UE can transmit is increased. In other words, the example 1-2 is preferable for a traffic model in which traffic fluctuation occurs periodically. Further, in the example 1-2, compared with the example 1-1, it is possible for the reception side user apparatus UE2 to determine that resources are reserved for a long time duration.

Second Embodiment

Next, a second embodiment will be described. According to the second embodiment, the transmission side user apparatus UE1, in addition to transmitting control information and data at a predetermined timing, by using the control information or the data transmitted at the predetermined timing, transmits to the reception side user apparatus UE2 resource reservation information indicating a resource for control information that will be transmitted at a timing later than the predetermined timing. Further, the user apparatus UE1 transmits the resource for data to be transmitted at the later timing by using the control information that will be in actuality transmitted at the timing later than the predetermined timing. In other words, according to the second embodiment, different from the first embodiment, the resource reservation information does not include information indicating a resource used for transmitting data that is to be transmitted at a timing later than the predetermined timing, but includes only information indicating a resource used for transmitting control information that is to be transmitted at the timing later than the predetermined timing.

The information indicating a resource for control information included in the resource reservation information may indicate a time resource (a resource position in the time direction) of the control information. Further, in general, a resource size for control information does not depend on the data size. Therefore, the information indicating a resource for control information included in the resource reservation information may be a resource of time and frequency (a resource position in the frequency direction). It should be noted that, as illustrated in FIG. 10A or FIG. 10C, in the case where control information and data are transmitted in different time areas (e.g., different subframes or symbols) and where a gap of the time areas in which the control information and the data are transmitted is not fixed in advance, the resource reservation information may further include a time resource of the data. The resource reservation information may also include, similar to the first embodiment, TA, Group destination ID, etc.

In the second embodiment, there is an example 2-1 and an example 2-2 as more detailed operation examples. In the example 2-1, the user apparatus UE transmits to the reception side user apparatus UE2 resource reservation information that indicates a resource for control information and data that will be transmitted only at a timing subsequent to the predetermined timing. In the example 2-2, the user apparatus UE transmits to the reception side user apparatus UE2 resource reservation information that indicates resources for control information and data that will be transmitted in a predetermined cycle after the predetermined timing.

Example 2-1: Single Reservation

Figure 13A:
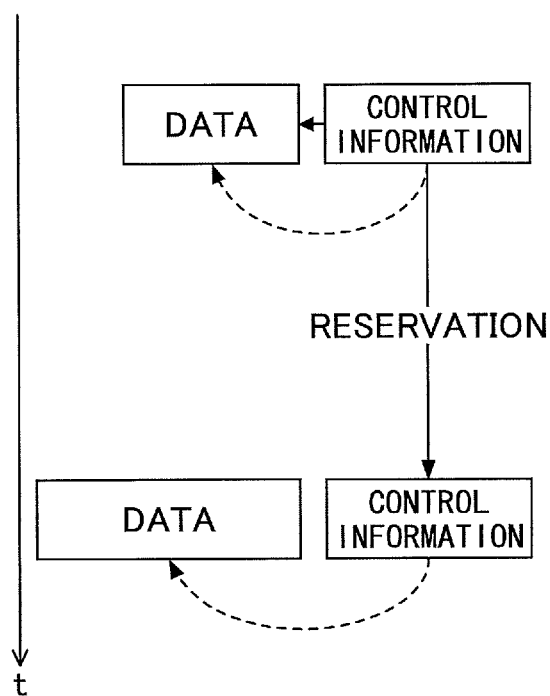
FIG. 13A is a drawing illustrating a resource reservation method according to a second embodiment.

FIG. 13A illustrates a resource reservation method in the example 2-1. A lower layer (layer 1 or layer 2) of the user apparatus UE determines that the user apparatus UE should transmit data at a timing subsequent to a predetermined timing according to an indication from an upper layer (layer 3, etc.)

Next, as illustrated in FIG. 13A, the user apparatus UE includes, in control information to be transmitted at the predetermined timing, resource allocation information indicating resources for the data to be transmitted at the predetermined timing and resource reservation information indicating resources for control information to be transmitted only at the subsequent timing, in transmission.

Next, when transmitting data at the subsequent timing, the lower layer of the user apparatus UE recognizes the size of the data that should be transmitted according to an indication from the upper layer, etc., determines positions/range, etc. (the number of PRBs, MCS, etc.) of a resource that includes data to be transmitted at the subsequent timing, includes resource allocation information in control information, and transmits the included control information.

Figure 14A:
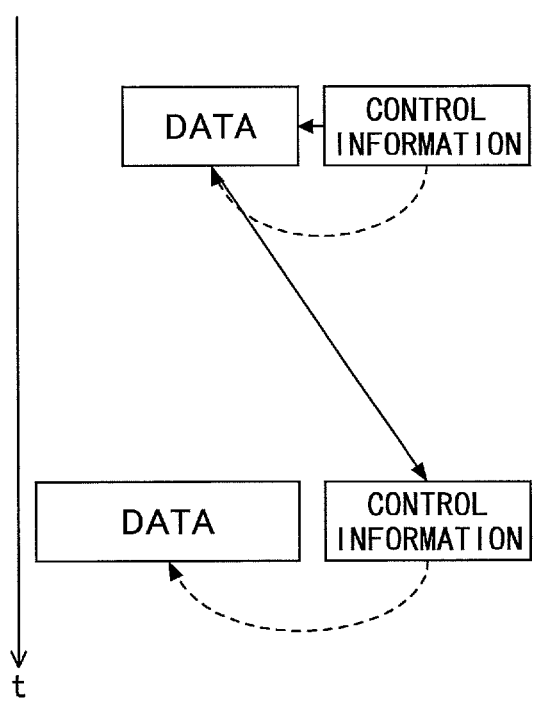
FIG. 14A is a drawing illustrating a resource reservation method according to the second embodiment.

It should be noted that, in the example 2-1, the user apparatus UE may not need to include the resource reservation information in control information that is transmitted at the predetermined timing, but, as illustrated in FIG. 14A, may include the resource reservation information in MAC control information included in data that is transmitted at the predetermined timing in transmission.

Example 2-2: Semi-Static Reservation

Figure 13B:
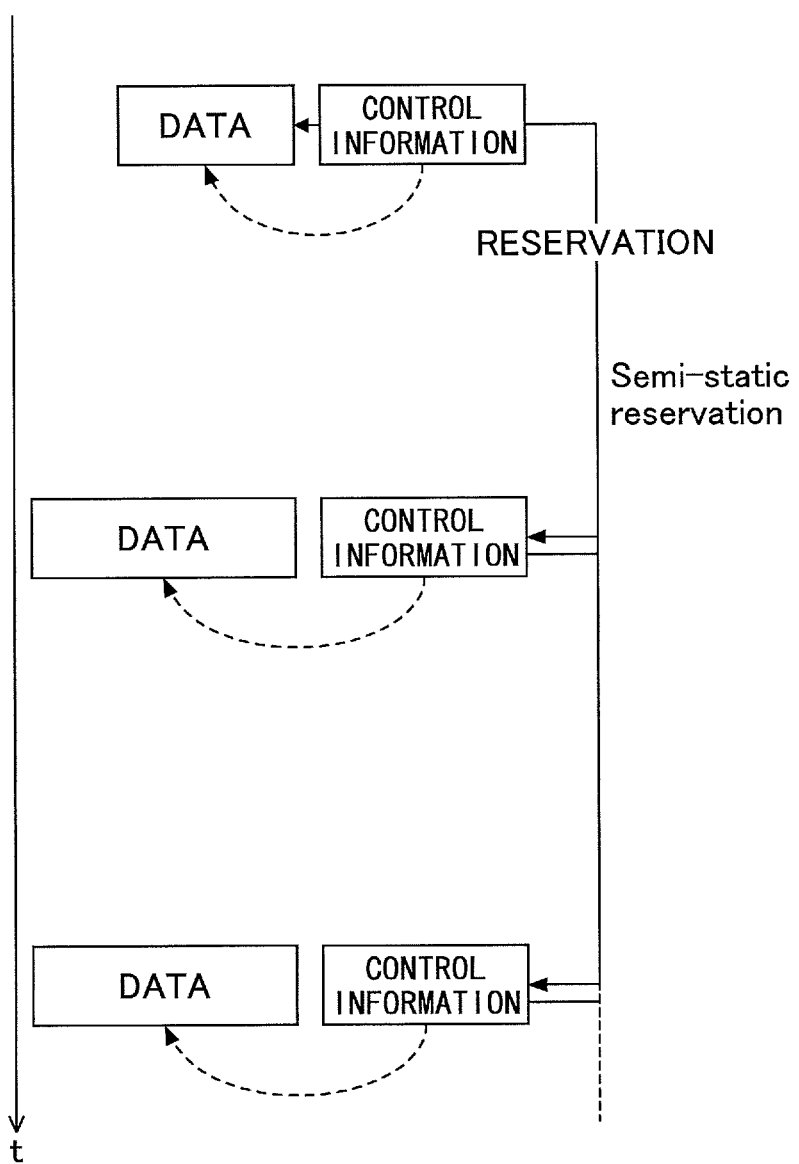
FIG. 13B is a drawing illustrating a resource reservation method according to the second embodiment.

FIG. 13B illustrates a resource reservation method in an example 2-2. In the example 2-2, the user apparatus UE transmits to the reception side user apparatus UE2 resource reservation information that indicates resources for control information that will be transmitted over a predetermined cycle after the predetermined timing.

In the example 2-2, the resource reservation information not only indicates a resource reserved for the subsequent timing as in the example 2-1, but also indicates resources commonly reserved for a plurality of consecutive timings. Upon receiving the resource reservation information, it is possible for the reception side user apparatus UE2 to determine that the resources are reserved consecutively in a predetermined cycle, regardless of the reception timing in which the reception side user apparatus UE2 receives the resource reservation information.

Figure 14B:
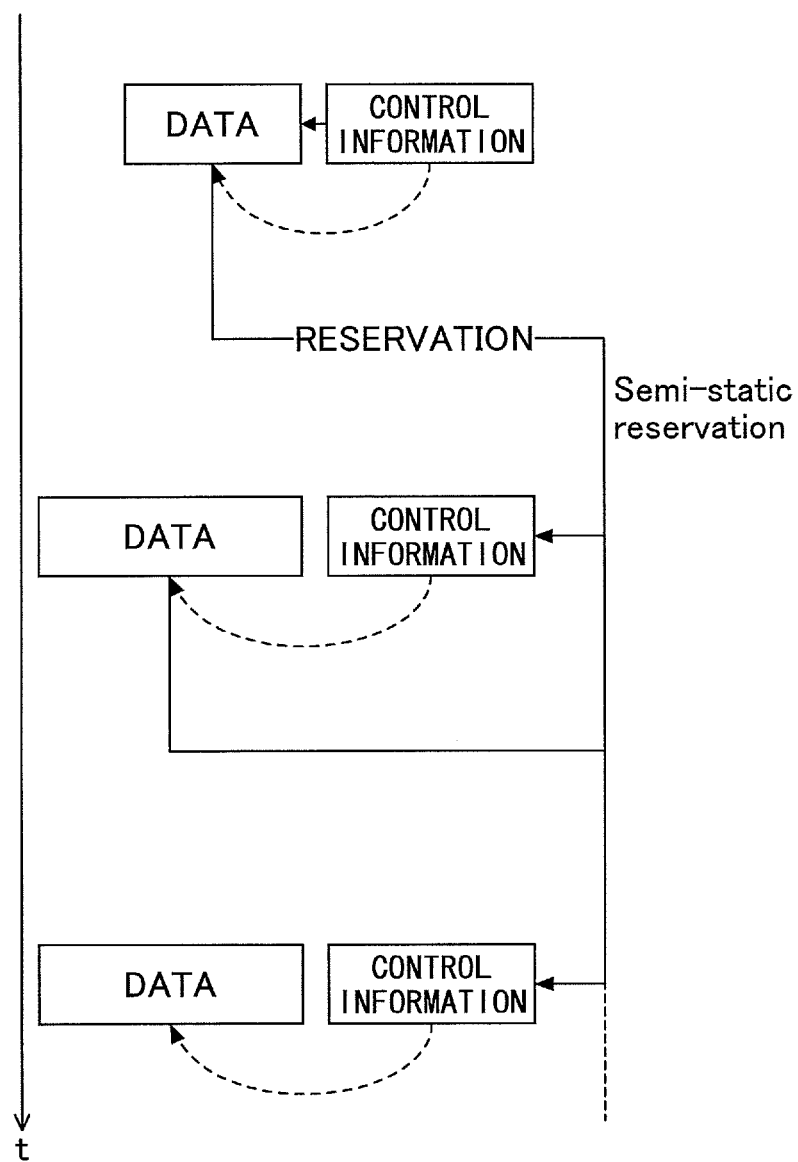
FIG. 14B is a drawing illustrating a resource reservation method according to the second embodiment.

In the example 2-2, the user apparatus UE may not need to include the resource reservation information in control information that is transmitted at the predetermined timing, but, as illustrated in FIG. 14B, may include the resource reservation information in MAC control information included in data that is transmitted at the predetermined timing, in transmission.

It should be noted that, in the above example 2-1 and the example 2-2, the user apparatus UE may include, in the resource reservation information, as information roughly indicating a resource used for transmitting data to be transmitted at a timing later than the predetermined timing, a possible minimum or maximum resource range (ranges of time resource and frequency resource) which may be allocated by the resource allocation information. With the above arrangement, it is possible to dynamically change transmission resources by considering interference and D2D/Cellular signal transmission/reception.

According to the second embodiment, it is not necessary for the transmission side user apparatus UE1 to transmit a resource used for transmitting "data" in advance to the reception side user apparatus UE2, and thus, the second embodiment is preferable for a case in which data, whose data size fluctuates greatly, is transmitted periodically while control information overhead is reduced.

<Supplementary Matter Related to the First and Second Embodiments>

(Release of Reserved Resource)

The example 1-2 and the example 2-2 are methods in which semi-static reservation is performed. Therefore, in the case where the transmission side user apparatus UE1 stops packet transmission, it is necessary for the transmission side user apparatus UE1 to release the reserved resources.

Here, in the case where the transmission side user apparatus UE1 releases the resources, the transmission side user apparatus UE1 may include, in the control information or the MAC control information, information indicating that the subsequent resources will be released (hereinafter, referred to as "resource release indication"), in transmission to the reception side user apparatus UE2.

Further, considering a case in which the reception side user apparatus UE2 fails to receive (recognize/identify) the resource release indication, the transmission side user apparatus UE1 may continuously transmit the resource release indication for a certain number of times.

Further, as another example, in the case where the transmission side user apparatus UE1 releases the resources, the transmission side user apparatus UE1 may transmit to the reception side user apparatus UE2 data filled with zeros as information indicating that the subsequent resources will be released. Further, considering a case in which the reception side user apparatus UE2 fails to receive (recognize/identify) the data filled with zeros, the transmission side user apparatus UE1 may continuously transmit the data filled with zeros for a certain number of times. In the case where the received data is filled with zeros, the reception side user apparatus UE determines that the reserved resources have been released.

Further, as another example, the reception side user apparatus UE2 may determine that the reserved resources are released in the case where control information and/or data cannot be detected in the reserved resources during a predetermined period or for a predetermined number of times. The predetermined period may be a predetermined resource pool period, or a plurality of resource pool periods.

(Other Supplementary Matter)

As illustrated in FIG. 10A or FIG. 10C, in the case where control information and data are transmitted in different time areas (e.g., different subframes or symbols) and where a relative relationship and/or occupancy time of the time areas in which the control information and the data are transmitted are not fixed in advance, the resource reservation information may include information specifically indicating a position of time resources for data in the resource reservation information. The information may be a subframe number, etc., indicating an absolute position of a time resource of the data, or an offset value indicating a relative position between the resource position of the control information and the resource position of the data.

The reception side user apparatus UE2 may determine whether the resource reservation information included in the control information or the MAC control information is valid or not based on the measurement result of the reception quality of the resources via which the control information is received or the resources via which data is received, and, in the case where the reception side user apparatus UE2 determines that the resource reservation information is not valid, the resources indicated by the resource reservation information may be assumed to have been released. It should be noted that the reception side user apparatus UE2 may determine whether the resource reservation information included in the control information or the MAC control information is valid or not based on whether reception quality (RSRQ, RSRP, etc.) of DM-RS, which is inserted in resources via which the data is received or in resources via which the control information is received, is equal to or greater than a predetermined threshold value.

When reserving resources for control information and/or data through a predetermined cycle, the transmission side user apparatus UE1 may specifically set a value for the predetermined cycle or may set an index value indicating a reserved resource cycle (index value indicating, for example, 20 ms, 50 ms, 100 ms, 200 ms, 500 ms, etc.) in the resource reservation information.

When reserving resources for control information and/or data through a predetermined cycle by using the resource reservation information, the transmission side user apparatus UE1 may reserve resources in such a way that time hopping is applied to the resource positions and may include, in the resource reservation information, information indicating that the time hopping is applied to the resource positions. Specifically, for example, in the example 1-2 or the example 2-2, the transmission side user apparatus UE1 may include, in the resource reservation information, the above-described index value and a time hopping pattern or an offset value (e.g., subframe offset) with respect to the reserved resource positions.

By having the time hopping applied to the reserved resource positions, in an environment in which multiple transmission side user apparatuses UE1 are present, it is possible to avoid a risk in which control information and/or data from multiple user apparatuses UE1 are transmitted in the same cycle and collisions occur consistently.

The transmission side user apparatus UE1 may separate control information including resource allocation information from control information including resource reservation information, and may transmit the control information including resource allocation information and the control information including resource reservation information as different control information items. The control information including resource allocation information and the control information including resource reservation information may have different formats.

In the first embodiment, when in actuality transmitting data by using the reserved resource for data transmission, the transmission side user apparatus UE1 may change resource positions/ranges according to the actual packet size of the transmission data, and transmit resource allocation information in which changed resource positions/ranges are set. With the above arrangement, even in the first embodiment, similar to the second embodiment, it is possible to correspond to (be adapted to) a case in which data, whose data size fluctuates greatly, is transmitted periodically.

Third Embodiment

In a third embodiment, the base station eNB allocates resources for transmitting control information and/or data at a timing later than a predetermined timing, and indicates (transmits) the allocated resources to the transmission side user apparatus UE1.

In the third embodiment, the resource allocation is performed by the base station eNB, and thus, it is possible to allocate resources orthogonal to each other to multiple user apparatuses UE.

As more detailed operation examples, there is an example 3-1 and an example 3-2. In the example 3-1, the base station eNB transmits the allocated resource to the user apparatus UE by using RRC messages alone. The example 3-1 resembles the resource allocation method according to Type2b described in the D2D overview. In the example 3-2, the base station eNB transmits the allocated resource to the user apparatus UE by using RRC messages and DCI (Downlink Control Information). The example 3-2 resembles SPS (Semi-Persistent Scheduling) in the conventional LTE.

Example 3-1

Figure 15A:
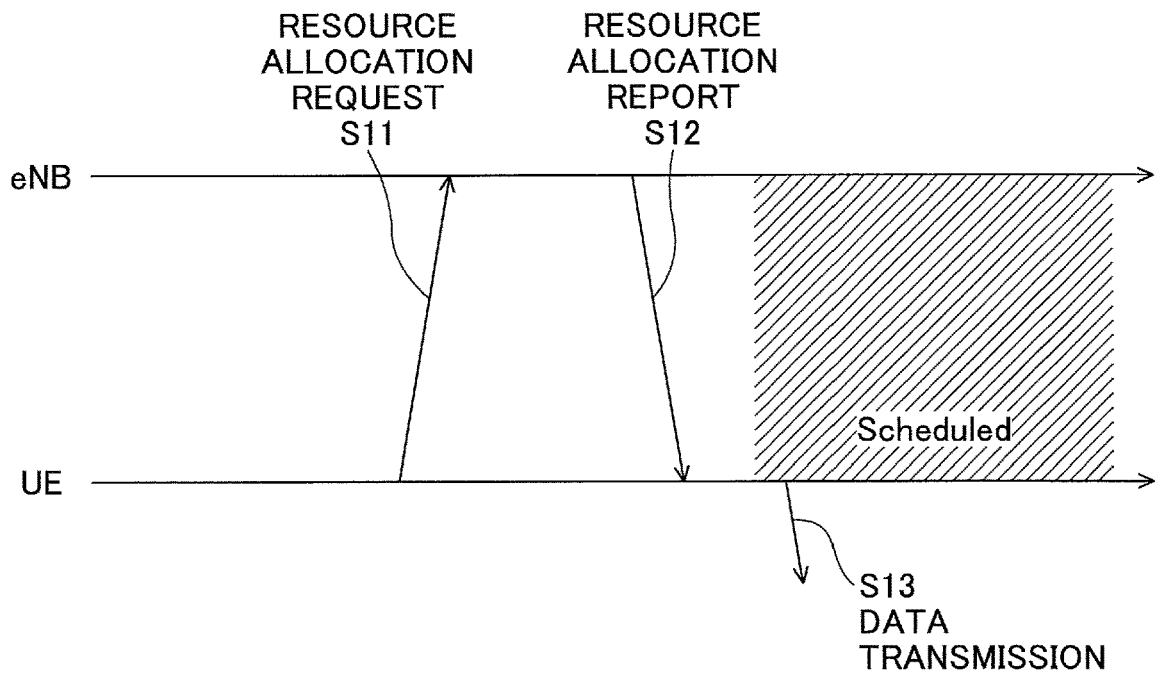
FIG. 15A is a drawing illustrating a resource reservation method according to a third embodiment.

FIG. 15A illustrates a resource reservation method in the example 3-1. A lower layer (layer 1 or layer 2) of the user apparatus UE determines that the user apparatus UE should transmit data at a timing subsequent to a predetermined timing according to an indication from an upper layer (layer 3, etc.)

Next, the transmission side user apparatus UE requests the base station eNB to allocate resources for transmitting control information and/or data in a predetermined cycle, by using an RRC message, MAC control information, a PUCCH, a RACH, etc. (S11) In the request, information indicating a size (packet size, BS (Buffer Size), or the like) of data to be transmitted in each cycle may be included.

The base station eNB allocates resources for transmitting control information and/or data in the predetermined cycle, and transmits information indicating the allocated (reserved) resources to the user apparatus UE (S12). The user apparatus UE transmits control information and data by using the resources allocated in the predetermined cycle (S13).

Contents of the information indicating the allocated resources include a cycle of resources of control information and/or data, resource positions/ranges of control information and/or data. The resource cycle may be specified by a specific value of the predetermined cycle, or may be specified by the above-described index value.

It should be noted that, regarding the data resources, the base station eNB may allocate resources in a predetermined cycle only in the time direction, and, regarding the resources in the frequency direction, the base station eNB may cause the user apparatus UE to determine by itself the resources in the frequency direction when the user apparatus UE transmits data in actuality. The above arrangement is preferable for a case in which data, whose data size fluctuates greatly, is transmitted periodically. In this case, in order to reduce probability of resource collisions in the frequency direction between multiple user apparatuses UE, the base station eNB may roughly allocate the resources in the frequency direction and transmit the allocated resources to the user apparatus UE. Specifically, the base station eNB may transmit to the user apparatus UE a range of resources (minimum or maximum set of PRBs) in which the user apparatus UE can select any resource.

Further, as another example, as described in the example 1-2, the base station eNB may allocate resources in such a way that resources for transmitting control information and data in different cycles are overlapped. At a timing when the cycles are overlapped, amount of data the user apparatus UE can transmit is increased, which is preferable for a traffic model in which traffic fluctuation occurs periodically.

In the processing steps of S12, the base station eNB may include, in the information indicating the allocated resources, information indicating an effective time duration of the resources. The user apparatus UE transmits control information and data by using the resources allocated in a predetermined cycle during the effective time duration. Further, in this case, even in the case where an RRC status of the user apparatus UE transitions to Idle, the user apparatus UE may transmit control information and data by using the allocated resources assuming that the allocated resources are valid during the effective time duration. It is possible for the user apparatus UE to continue D2D communications with another user apparatus UE during the effective time duration even in the case where the RRC status between the base station eNB and the user apparatus UE has transitioned from Connected to Idle.

Example 3-2

Figure 15B:
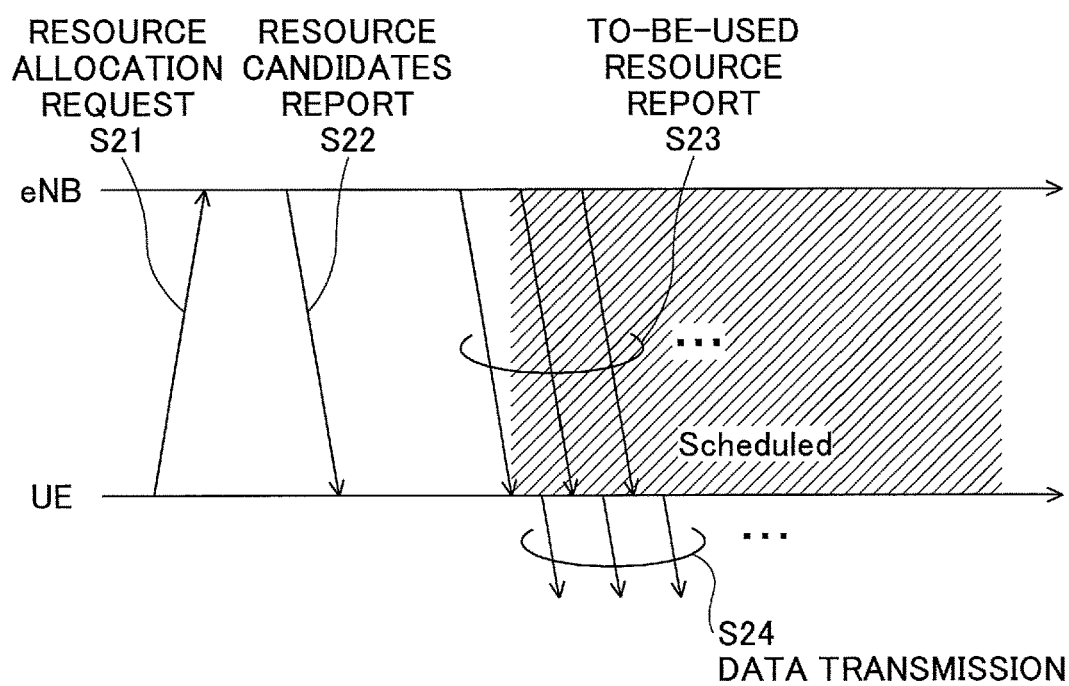
FIG. 15B is a drawing illustrating a resource reservation method according to the third embodiment.

FIG. 15B illustrates a resource reservation method in an example 3-2. A lower layer (layer 1 or layer 2) of the user apparatus UE determines that the user apparatus UE should transmit data at a timing subsequent to a predetermined timing according to an indication from an upper layer (layer 3, etc.) Processing steps of S21 are the same as those of step S11 of FIG. 15A, and thus, the descriptions will be omitted.

The base station eNB selects multiple resource candidates for transmitting control information and/or data through a predetermined cycle, and transmits information indicating the selected resource candidates to the user apparatus UE by using an RRC message (S22). Contents of the information indicating the selected resource candidates include a resource cycle of control information and/or data, and resource positions/ranges of control information and/or data for each resource candidate. A resource candidate identifier for identifying each resource candidate may be given to each resource candidate.

The base station eNB selects a resource from the multiple resource candidates at the timing when the base station eNB in actuality allocates a resource to the user apparatus UE, and transmits the selected resource to the user apparatus UE by using DCI (S23). The user apparatus UE transmits control information and data by using the resource transmitted by the DCI (S24).

It should be noted that the base station eNB may transmit the selected resource to the user apparatus UE by setting the resource candidate identifier in DCI. Further, when the base station eNB selects a resource from the multiple resource candidates, by considering the size of data, reported (transmitted) by the user apparatus UE in the processing steps of S21, to be transmitted in each cycle, the base station eNB may select a resource in which data of that size can be transmitted.

According to the example 3-2, it is possible to transmit an indication indicating the resource to be used by the user apparatus UE dynamically at the timing when the user apparatus UE in actuality perform data transmission. Further, with the above arrangement, it is possible to appropriately avoid collisions between D2D communications and cellular communications in a carrier in which D2D communication resources and cellular communication resources are shared.

(Supplementary Matter Related to the Third Embodiment)

In the third embodiment, it is the base station eNB that performs resource allocation (reservation). However, as in the first embodiment and the second embodiment, it is expected that the user apparatus UE is allowed to simultaneously perform resource allocation according to the network operations. In this case, for example, a user apparatus UE that operates according to the third embodiment and a user apparatus UE that operates according to the first embodiment or the second embodiment might involve the same carrier (or, the same carrier and the same resource pool), and there is a risk in which resources that have been allocated (reserved) by the base station eNB collide with resources that have been allocated (reserved) by the user apparatus UE.

In order to solve this type of problem, in the third embodiment, the base station eNB (including RSU) may indicate (transmit) to the user apparatus UE the resources that have been allocated by the base station eNB by using broadcast information (SIB), an RRC message, DCI, etc. With the above arrangement, it is possible for the user apparatus UE to reserve resources by avoiding the resources that have already been allocated by the base station eNB.

It should be noted that, in the case where the base station eNB indicates the resources that have already been allocated by using DCI, the base station eNB may indicate the resources by using "Common search space" in the DCI. Further, in the case where the base station eNB indicates the resources that have already been allocated by using DCI, the base station eNB may transmit information indicating the resources that have already been allocated by dividing the resources into time block units such as 10 ms units and transmitting the divided units. Further, an RNTI corresponding to a specific group of user apparatuses UE (e.g., user apparatuses UE that have capability of operating according to the first embodiment or the second embodiment) may be defined in advance, and the base station eNB may mask the DCI with the RNTI. With the above arrangement, it is possible for only the specific user apparatuses UE to monitor the DCI including the information indicating the resources that have already been allocated, and it is possible to reduce battery consumption of user apparatuses UE other than the specific user apparatuses UE.

Further, the resources, which have been allocated (reserved) by the user apparatus UE that operates according to the first embodiment or the second embodiment, may be indicated to the base station eNB, and the base station eNB may indicate the indicated resources to other user apparatuses UE by using broadcast information (SIB), an RRC message, DCI, etc. With the above arrangement, it is possible to indicate the resources that have already been reserved to a user apparatus UE (hidden terminal) that has failed to receive the resource reservation information transmitted by the user apparatus UE that operates according to the first embodiment or the second embodiment.

Alternatively, it may be possible to facilitate allocation by the base station eNB of appropriate resources by reporting, in the resource allocation request from the user apparatus UE1, an interference state of each subframe, measurement results of occupied resources (reserved resources and/or resources whose detection power level is equal to or higher than a certain level), vacant resources, resource positions that the user apparatus UE1 requests to be allocated (subframes, resource blocks, etc.), or a list thereof (a list indicating the above).

Further, the user apparatus UE1 may perform implicit resource allocation (resource reservation transmission to the base station eNB) in which the user apparatus UE1 transmits the desired transmission resource to the base station eNB and the user apparatus UE1 performs transmission by using the desired transmission resource as long as a response (rejection) is not received from the base station eNB. The user apparatus UE1 may transmit to the base station eNB the desired transmission resource as lower layer control information such as a PUCCH. By adding this type of transmission from the user apparatus UE1, it is possible to both use resource reservation according to communications between terminals as obtained by applying the first embodiment or the second embodiment and to use resource orthogonalization according to resource allocation performed by the base station eNB, and thus, it is possible to realize more reliable resource orthogonalization.

<Functional Structure>

In the following, examples of functional structures of a user apparatus UE and a base station eNB, which perform above described operations according to an embodiment, will be described. It should be noted that the user apparatus UE may be capable of performing a part of the above described processes of the user apparatus UE (e.g., processes of a specific example or several examples).

(User Apparatus)

Figure 16:
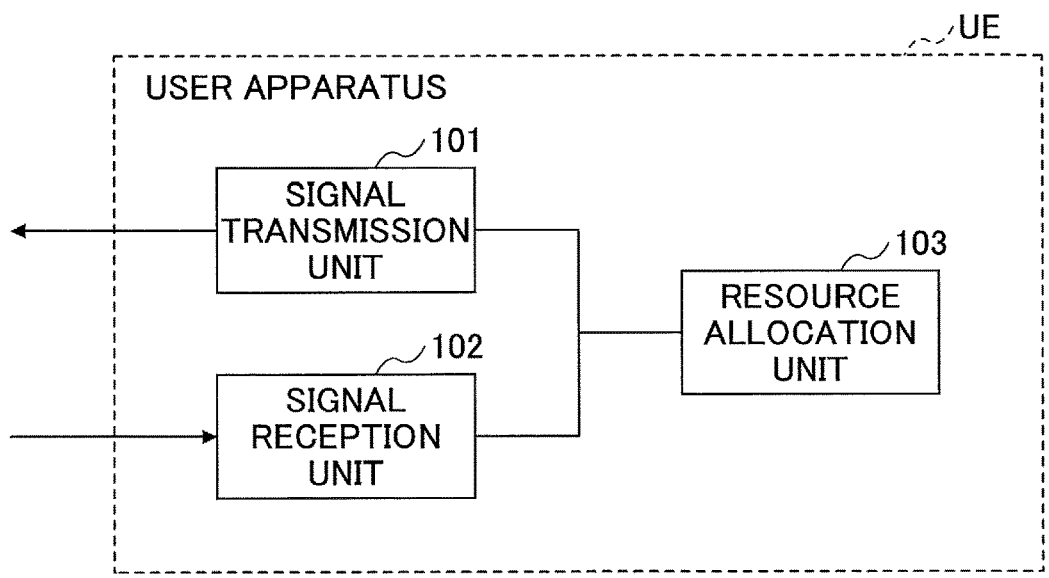
FIG. 16 is a drawing illustrating an example of a functional structure of a user apparatus according to an embodiment.

FIG. 16 is a drawing illustrating an example of a functional structure of a user apparatus UE according to an embodiment. As illustrated in FIG. 16, the user apparatus UE includes a signal transmission unit 101, a signal reception unit 102, and a resource allocation unit 103. It should be noted that FIG. 16 illustrates functional units of the user apparatus UE especially related to an embodiment only, and thus, the user apparatus UE further includes at the least functions for performing operations according to LTE (not shown in the figure). Further, a functional structure illustrated in FIG. 16 is merely an example. Any functional classification and any names of functional units may be applied as long as operations related to an embodiment can be performed.

The signal transmission unit 101 includes a function for wirelessly transmitting various types of physical layer signals generated from an upper layer signal which should be transmitted from the user apparatus UE. Further, the signal transmission unit 101 has a transmission function of D2D signals and a transmission function of cellular communications.

Further, the signal transmission unit 101 transmits the resource reservation information received from the resource allocation unit 103 to a user apparatus UE. Further, the signal transmission unit 101 may transmit information indicating a release of an allocated resource (resource release indication) to a user apparatus UE. The signal transmission unit 101 may transmit the resource reservation information and the resource release indication to a user apparatus UE by using a physical control channel for D2D (e.g., PSCCH) or a physical data channel for D2D (e.g., PSSCH).

The signal reception unit 102 includes a function for wirelessly receiving various types of signals from another user apparatus UE or the base station eNB, and obtaining upper layer signals from the received physical layer signals. Further, the signal reception unit 102 has a reception function of D2D signals and a reception function of cellular communications.

The resource allocation unit 103 allocates (reserves) resources for control information and/or data to be transmitted at a transmission timing subsequent to a predetermined transmission timing, generates resource reservation information including information indicating the allocated resources, and transmits the resource reservation information to the signal transmission unit 101. Further, the resource allocation unit 103 allocates (reserves) resources for control information and/or data to be transmitted in a predetermined cycle, generates resource reservation information including information indicating the allocated resources, and transmits the resource reservation information to the signal transmission unit 101.

Further, the resource allocation unit 103 may allocate (reserve) resources for control information to be transmitted in a predetermined cycle, allocate (reserve) resources for data to be transmitted in the predetermined cycle, allocate (reserve) resources for control information to be transmitted in a cycle different from the predetermined cycle, allocate (reserve) resources for data to be transmitted in the cycle different from the predetermined cycle, generate resource reservation information including the allocated resources, and transmit the resource reservation information to the signal transmission unit 101.

Further, the resource allocation unit 103 may determine whether the allocated resources (resources for control information and/or data) should be released, and, in the case where it is determined that the allocated resources should be released, may indicate to the signal transmission unit 101 to transmit to the user apparatus UE information indicating that the allocated resources should be released (resource release indication).

(Base Station)

Figure 17:
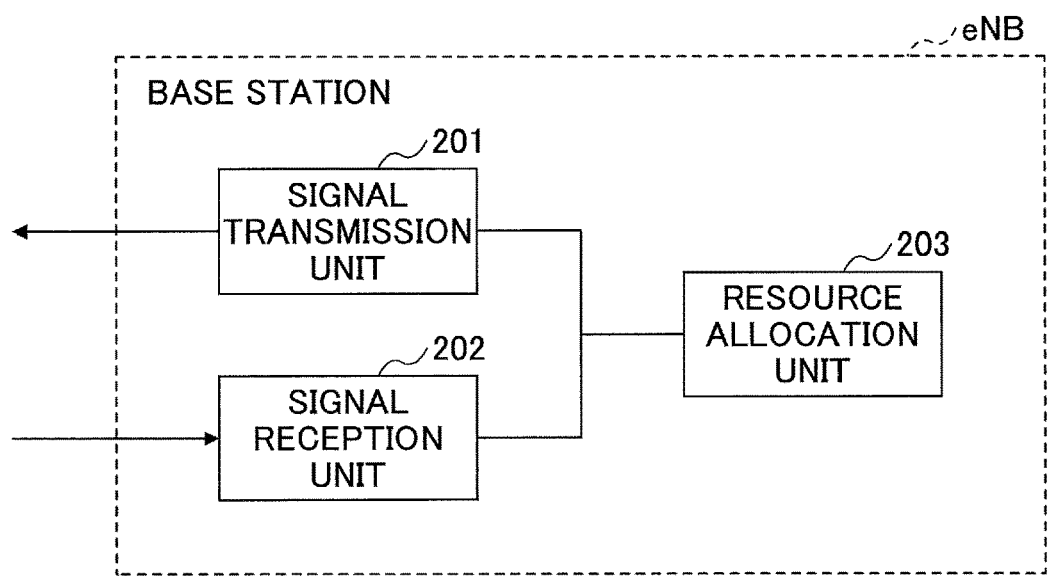
FIG. 17 is a drawing illustrating an example of a functional structure of a base station according to an embodiment.

FIG. 17 is a drawing illustrating an example of a functional structure of a base station eNB according to an embodiment. As illustrated in FIG. 17, the base station eNB includes a signal transmission unit 201, a signal reception unit 202, and a resource allocation unit 203. FIG. 17 illustrates functional units of the base station eNB especially related to an embodiment only, and thus, the base station eNB further includes at the least functions for performing operations according to LTE (not shown in the figure). Further, a functional structure illustrated in FIG. 17 is merely an example. Any functional classification and any names of functional units may be applied as long as operations related to an embodiment can be performed.

The signal transmission unit 201 includes a function for wirelessly transmitting various types of physical layer signals generated from an upper layer signal which should be transmitted from the base station eNB. Further, the signal transmission unit 201 transmits the information, received from the resource allocation unit 203, indicating the allocated resources to the user apparatus UE. It should be noted that the signal transmission unit 201 may transmit the information indicating the allocated resources to the user apparatus UE by using broadcast information (SIB), an RRC message, DCI, etc.

The signal reception unit 202 includes a function for wirelessly receiving various kinds of signals from the user apparatus UE, and obtaining upper layer signals from the received physical layer signals.

The resource allocation unit 203 allocates (reserves) resources for control information and/or data to be transmitted in a predetermined cycle, generates information indicating the allocated resources, and transmits the information to the signal transmission unit 201.

The above-described functional structures of the user apparatus UE and the base station eNB may be entirely realized by a hardware circuit (e.g., one or more IC chips), or may be partially realized by a hardware circuit and the remaining part may be realized by a CPU and programs.

(User Apparatus)

Figure 18:
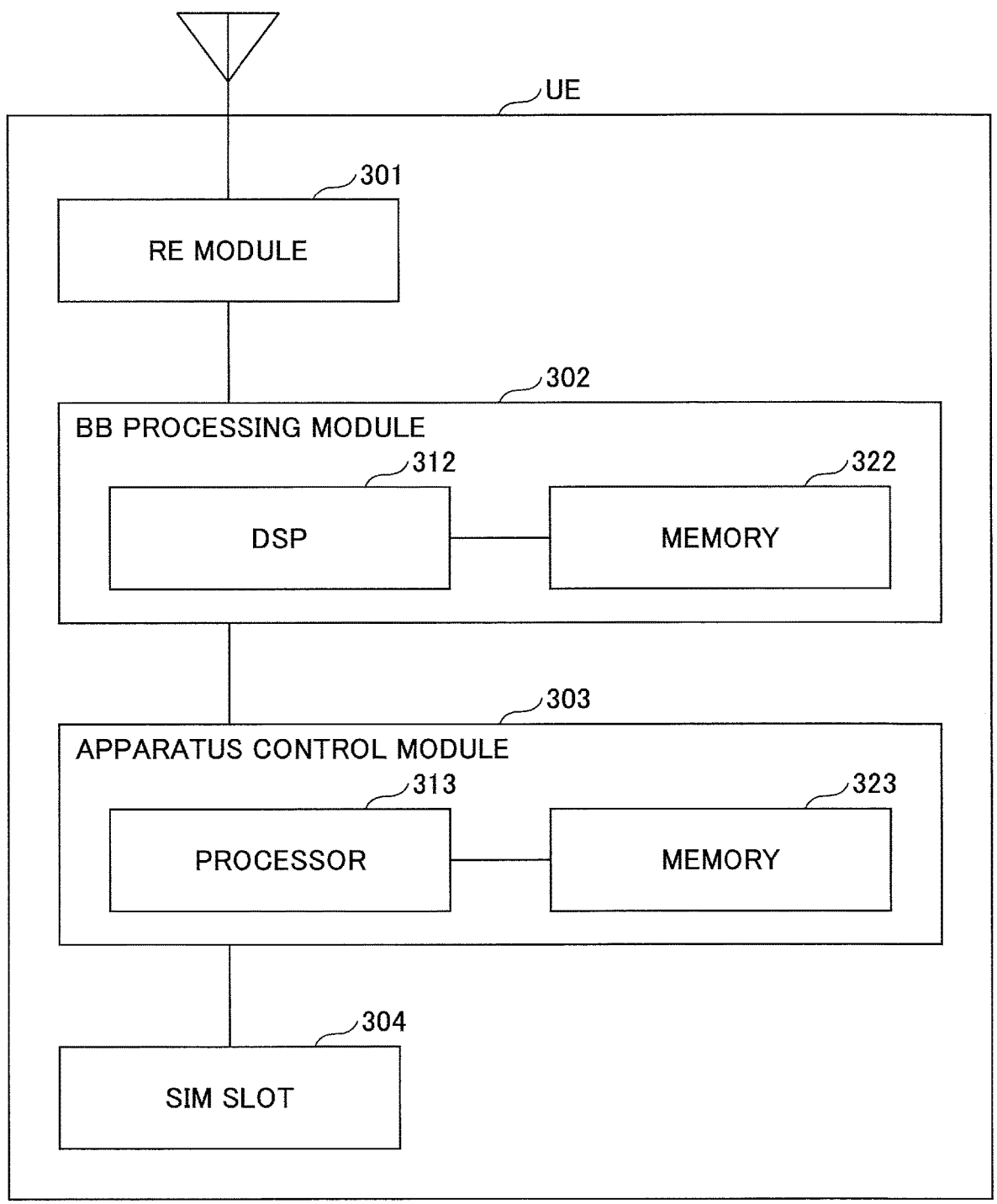
FIG. 18 is a drawing illustrating an example of a hardware configuration of a user apparatus according to an embodiment.

FIG. 18 is a drawing illustrating an example of a hardware configuration of a user apparatus UE according to an embodiment. FIG. 18 illustrates a structure closer to an implementation example compared to FIG. 16. As illustrated in FIG. 18, the user apparatus UE includes an RE (Radio Equipment) module 301 for performing a process related to a radio signal, a BB (Base Band) processing module 302 for performing baseband signal processing, an apparatus control module 303 for performing a process of an upper layer, etc., and a SIM slot 304 that is an interface used for accessing a SIM card.

The RE module 301 generates a radio signal to be transmitted from an antenna by performing D/A (Digital to Analog) conversion, modulation, frequency conversion, power amplification, etc., for a digital baseband signal received from the BB processing module 302. Further, the RE module 301 generates a digital baseband signal by performing frequency conversion, A/D (Analog to Digital) conversion, demodulation, etc., for a received radio signal, and transmits the generated signal to the BB processing module 302. The RE module 301 includes, for example, a part of the signal transmission unit 101 and a part of the signal reception unit 102 illustrated in FIG. 16.

The BB processing module 302 performs a process of converting bidirectionally between an IP packet and a digital baseband signal. A DSP (Digital Signal Processor) 312 is a processor for performing signal processing in the BB processing module 302. A memory 322 is used as a work area of the DSP 312. The RE module 301 includes, for example, a part of the signal transmission unit 101, a part of the signal reception unit 102, and a part of the resource allocation unit 103 illustrated in FIG. 16.

The apparatus control module 303 performs IP layer protocol processing, various types of applications processing, etc. A processor 313 performs a process for the apparatus control module 303. A memory 323 is used as a work area of the processor 313. Further, the processor 313 writes and reads data to and from a SIM via the SIM slot 304. The apparatus control module 303 includes, for example, a part of the resource allocation unit 103 illustrated in FIG. 16.

(Base Station)

Figure 19:
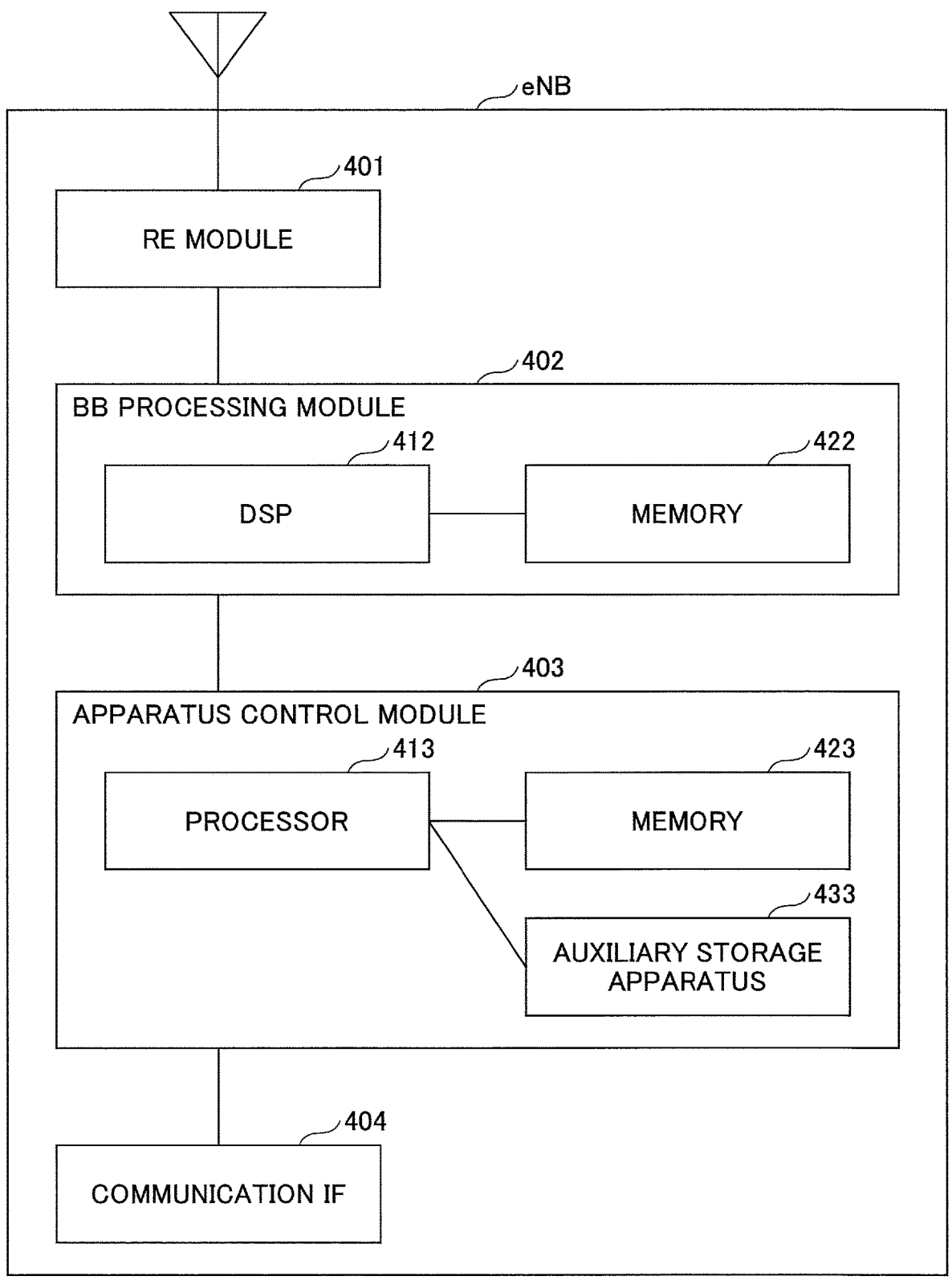
FIG. 19 is a drawing illustrating an example of a hardware configuration of a base station according to an embodiment.

FIG. 19 is a drawing illustrating an example of a hardware configuration of a base station eNB according to an embodiment. FIG. 19 illustrates a structure closer to an implementation example compared to FIG. 17. As illustrated in FIG. 19, the base station eNB includes an RE module 401 for performing a process related to a wireless signal, a BB processing module 402 for performing a baseband signal process, an apparatus control module 403 for performing a process of an upper layer, etc., and a communication IF 404 as an interface for connecting to a network.

The RE module 401 generates a radio signal to be transmitted from an antenna by performing D/A conversion, modulation, frequency conversion, power amplification, etc., for a digital baseband signal received from the BB processing module 402. Further, the RE module 161 generates a digital baseband signal by performing frequency conversion, A/D conversion, demodulation, etc., for a received radio signal, and transmits the generated signal to the BB processing module 402. The RE module 401 includes, for example, a part of the signal transmission unit 201 and a part of the signal reception unit 202 illustrated in FIG. 17.

The BB processing module 402 performs a process of converting bidirectionally between an IP packet and a digital baseband signal. A DSP 412 is a processor for performing a signal processing in the BB processing module 402. A memory 422 is used as a work area of the DSP 412. The BB processing module 402 includes, for example, a part of the signal transmission unit 201, a part of the signal reception unit 202, and a part of the resource allocation unit 203 illustrated in FIG. 17.

The apparatus control module 403 performs an IP layer protocol process, an operation and maintenance (OAM) process, etc. A processor 413 performs a process for the apparatus control module 403. A memory 423 is used as a work area of the processor 413. An auxiliary storage apparatus 433 is, for example, a HDD, etc., and stores various types of setting information items, etc., used for operations of the base station eNB. The apparatus control module 403 includes, for example, a part of the resource allocation unit 203 illustrated in FIG. 17.

<Summary>

As described above, a user apparatus according to an embodiment is provided in a wireless communication system in which D2D communications are supported. The user apparatus includes a resource allocation unit configured to allocate a resource for D2D control information to be transmitted at a transmission timing subsequent to a predetermined transmission timing; and a transmission unit configured to transmit resource reservation information including information indicating the resource for the D2D control information. With the above user apparatus UE, a technique is provided in which, in a D2D supported wireless communication system, it is possible to appropriately allocate resources for periodic D2D traffic in which data sizes are fluctuated.

Further, the resource allocation unit may allocate a resource for D2D data to be transmitted at a transmission timing subsequent to the predetermined transmission timing, and the resource reservation information may further include information indicating the resource for the D2D data. With the above arrangement, it is possible for the user apparatus UE to reserve a resource to be transmitted only at the subsequent timing, and it is possible to be adapted to (corresponding to) packet size fluctuation in a flexible manner.

Further, the resource allocation unit may allocate a resource for D2D control information to be transmitted in a first cycle, and the transmission unit may transmit resource reservation information including information indicating the allocated resource for the D2D control information to be transmitted in the first cycle. With the above arrangement, it is not necessary for the transmission side user apparatus UE1 to transmit a resource used for transmitting "data" in advance to the reception side user apparatus UE2, and thus, it is possible to reserve resources in a flexible manner in the case of periodically transmitting data whose data size fluctuates greatly.

Further, the resource allocation unit may allocate a resource for D2D control information to be transmitted in a first cycle, allocate a resource for D2D data to be transmitted in the first cycle, allocate a resource for D2D control information to be transmitted in a second cycle different from the first cycle, and allocate a resource for D2D data to be transmitted in the second cycle, and the transmission unit may transmit resource reservation information including information indicating the allocated resource for D2D control information to be transmitted in the first cycle, the allocated resource for D2D data to be transmitted in the first cycle, the allocated resource for D2D control information to be transmitted in the second cycle, and the allocated resource for D2D data to be transmitted in the second cycle. With the above arrangement, it is possible for the user apparatus UE to reserve resources in a flexible manner for a traffic model in which traffic fluctuations occur periodically. Further, it is possible for the transmission side user apparatus UE1 to transmit to the reception side user apparatus UE2 information indicating that the resources are reserved for a long time duration.

Further, the transmission unit may transmit information indicating a release of the allocated resource. With the above arrangement, it is possible for the transmission side user apparatus UE1 to transmit to the reception side user apparatus UE2 information indicating that the periodically allocated (reserved) resources have been released.

Further, the transmission unit may transmit the resource reservation information by using a physical control channel for D2D or a physical data channel for D2D. With the above arrangement, it is possible for the user apparatus UE to transmit the resource reservation information by using various methods.

Further, a base station according to an embodiment is provided in a wireless communication system in which D2D communications are supported. The base station includes a resource allocation unit configured to allocate resources for D2D control information and D2D data to be transmitted in a predetermined cycle; and a transmission unit configured to transmit to the user apparatus information indicating the resources for the D2D control information and the D2D data. With the above base station eNB, a technique is provided in which, in a D2D supported wireless communication system, it is possible to appropriately allocate resources for periodic D2D traffic in which data sizes fluctuate.

Further, the information may include an effective time duration of the resources for the D2D control information and the D2D data to be transmitted in the predetermined cycle. With the above arrangement, it is possible for the base station eNB to transmit an effective time duration of the resources to the user apparatus UE. Further, it is possible for the user apparatus UE to continue D2D communications with another user apparatus UE during the effective time duration even in the case where the RRC status between the base station eNB and the user apparatus UE has transitioned from Connected to Idle.

Further, an indication method performed by a user apparatus according to an embodiment is provided in a wireless communication system in which D2D communications are supported. The indication method includes allocating a resource for D2D control information to be transmitted at a transmission timing subsequent to a predetermined transmission timing; and transmitting resource reservation information including information indicating the resource for the D2D control information. With the above indication method, a technique is provided in which, in a D2D supported wireless communication system, it is possible to appropriately allocate resources for periodic D2D traffic in which data sizes fluctuate.

Further, an indication method performed by a base station according to an embodiment is provided in a wireless communication system in which D2D communications are supported. The indication method includes allocating resources for D2D control information and D2D data to be transmitted in a predetermined cycle to the user apparatus; and transmitting to the user apparatus information indicating the resources for the D2D control information and the D2D data to be transmitted in the predetermined cycle. With the above indication method, a technique is provided in which, in a D2D supported wireless communication system, it is possible to appropriately allocate resources for periodic D2D traffic in which data sizes fluctuate.

<Supplementary Description of Embodiment>

The control information may be referred to as SA (Scheduling Assignment), or, an SCI. The MAC control information may be referred to as MAC CE.

A control channel other than PSCCH may be used as long as it is a control channel for transmitting control information used for D2D communications (SCI, etc.) A data channel other than PSSCH may be used as long as it is a data channel for transmitting data (MAC PDU, etc.) used for D2D communications. A data channel other than PSDCH may be used as long as it is a data channel for transmitting data (discovery message, etc.) used for D2D discovery.

As described above, the apparatuses (user apparatus UE/base station eNB) according to an embodiment may include a CPU and a memory, may be realized by having a program executed by the CPU (processor), may be realized by hardware such as hardware circuitry in which the logic described in an embodiment is included, or may be realized by a mixture of a program and hardware.

As described above, embodiments have been described. The disclosed invention is not limited to these embodiments, and a person skilled in the art would understand various variations, modifications, replacements, or the like. Specific examples of numerical values have been used for encouraging understanding of the present invention. These numerical values are merely examples and, unless otherwise noted, any appropriate values may be used. In the above description, partitioning of items is not essential to the present invention. Contents described in more than two items may be combined if necessary. Contents described in one item may be applied to contents described in another item (as long as they do not conflict). In a functional block diagram, boundaries of functional units or processing units do not necessarily correspond to physical boundaries of parts. Operations of multiple functional units may be physically performed in a single part, or operations of a single functional unit may be physically performed by multiple parts. The order of steps in the above described sequences and flowcharts according to an embodiment may be changed as long as there is no contradiction. For the sake of description convenience, the user apparatus UE/the base station eNB have been described by using functional block diagrams. These apparatuses may be implemented by hardware, by software, or by combination of both. The software which is executed by a processor included in a user apparatus UE according to an embodiment and the software which is executed by a processor included in a base station eNB may be stored in a random access memory (RAM), a flash memory, a read-only memory (ROM), an EPROM, an EEPROM, a register, a hard disk drive (HDD), a removable disk, a CD-ROM, a database, a server, or any other appropriate recording medium.

It should be noted that the control information is an example of the control information for D2D according to an embodiment. The data is an example of the D2D data.

The present application is based on and claims the benefit of priority of Japanese Priority Application No. 2015-218011 filed on Nov. 5, 2015, the entire contents of which are hereby incorporated by reference.

DESCRIPTION OF THE REFERENCE NUMERALS

UE User apparatus
eNB Base station
101 Signal transmission unit
102 Signal reception unit
103 Resource allocation unit
201 Signal transmission unit
202 Signal reception unit
203 Resource allocation unit
301 RE module
302 BB processing module
303 Apparatus control module
304 SIM slot
401 RE module
402 BB processing module
403 Apparatus control module
404 Communication IF

What is claimed is:

1. A user apparatus comprising:
a resource allocation unit configured to determine a resource for D2D control information to be transmitted at a transmission timing subsequent to a predetermined timing of D2D control information;
a transmission unit configured to transmit resource reservation information including information indicating the determined resource for D2D control information; and
a reception unit configured to receive resource reservation information transmitted by another user apparatus and a D2D signal in a resource indicated by the resource reservation information transmitted by the other user apparatus, wherein the user apparatus determines that the resource, indicated by the resource reservation information transmitted by the other user apparatus, has been released in the case where reception quality of the D2D signal, received in the resource indicated by the resource reservation information transmitted by the other user apparatus, is less than a predetermined threshold value.

2. The user apparatus according to claim 1, wherein the resource allocation unit allocates a resource for D2D data to be transmitted at a transmission timing subsequent to the predetermined timing, and the D2D control information to be transmitted at the subsequent transmission timing further includes information indicating the resource for D2D data to be transmitted at the subsequent timing.

3. The user apparatus according to claim 2, wherein the resource allocation unit allocates resources for D2D control information to be transmitted in a first cycle, allocates resources for D2D data to be transmitted in the first cycle, allocates resources for D2D control information to be transmitted in a second cycle different from the first cycle, and allocates resources for D2D data to be transmitted in the second cycle, and the transmission unit transmits the resource reservation information including information indicating the allocated resources for D2D control information to be transmitted in the first cycle, the allocated resources for D2D data to be transmitted in the first cycle, the allocated resources for D2D control information to be transmitted in the second cycle, and the allocated resources for D2D data to be transmitted in the second cycle.

4. The user apparatus according to claim 3, wherein, the transmission unit transmits the resource reservation information by using a physical control channel for D2D or a physical data channel for D2D.

5. The user apparatus according to claim 2, wherein, the transmission unit transmits the resource reservation information by using a physical control channel for D2D or a physical data channel for D2D.

6. The user apparatus according to claim 1, wherein the resource allocation unit allocates resources for D2D control information to be transmitted in a first cycle, and the transmission unit transmits resource reservation information including information indicating the allocated resources for the D2D control information to be transmitted in the first cycle.

7. The user apparatus according to claim 6, wherein the transmission unit transmits information indicating that the allocated resources are released.

8. The user apparatus according to claim 7, wherein, the transmission unit transmits the resource reservation information by using a physical control channel for D2D or a physical data channel for D2D.

9. The user apparatus according to claim 6, wherein, the transmission unit transmits the resource reservation information by using a physical control channel for D2D or a physical data channel for D2D.

10. The user apparatus according to claim 1, wherein, the transmission unit transmits the resource reservation information by using a physical control channel for D2D or a physical data channel for D2D.

11. An indication method performed by a user apparatus, the indication method comprising:

allocating a resource for D2D control information to be transmitted at a transmission timing subsequent to a predetermined timing;

transmitting resource reservation information including information indicating the resource for D2D control information; and receiving resource reservation information transmitted by another user apparatus and a D2D signal in a resource indicated by the resource reservation information transmitted by the other user apparatus, wherein determining that the resource, indicated by the resource reservation information transmitted by the other user apparatus, has been released in the case where reception quality of the D2D signal, received in the resource indicated by the resource reservation information transmitted by the other user apparatus, is less than a predetermined threshold value.

* * * * *